(12) United States Patent
Weinberger et al.

(10) Patent No.: US 8,385,676 B2
(45) Date of Patent: Feb. 26, 2013

(54) CONTEXT-CLUSTER-LEVEL CONTROL OF FILTERING ITERATIONS IN AN ITERATIVE DISCRETE UNIVERSAL DENOISER

(75) Inventors: Marcelo Weinberger, San Jose, CA (US); Gadiel Seroussi, Cupertino, CA (US); Erik Ordentlich, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 777 days.

(21) Appl. No.: 12/512,548

(22) Filed: Jul. 30, 2009

(65) Prior Publication Data
US 2011/0026850 A1  Feb. 3, 2011

(51) Int. Cl.
*G06K 9/40* (2006.01)
(52) U.S. Cl. ........ 382/261; 348/250; 367/100; 382/128; 382/254; 702/190
(58) Field of Classification Search .................. None
See application file for complete search history.

(56) References Cited

U.S. PATENT DOCUMENTS

| | | | | |
|---|---|---|---|---|
| 5,349,567 | A * | 9/1994 | Reed | 367/100 |
| 6,310,967 | B1 * | 10/2001 | Heine et al. | 382/128 |
| 6,622,117 | B2 * | 9/2003 | Deligne et al. | 702/190 |
| 2007/0165961 | A1 * | 7/2007 | Lu | 382/254 |
| 2010/0020208 | A1 * | 1/2010 | Barbu | 348/250 |
| 2011/0090960 | A1 * | 4/2011 | Leontaris et al. | 375/240.12 |

OTHER PUBLICATIONS

Mallikarjuna et al (1989 IEEE "Iterative Composite filtering for Image Restoration").*
Sari-Sarraf et al teaches 1991 IEEE titled "Automated Iterative Noise Filtering".*
Lee, Jong-Sen teaches 1980 IEEE title "Digital Image Enhancement and Noise Filtering by Use of Local Statistics".*
Thibautl et al teaches 2006 SPIE-IS&T titled "A Recursive Filter for Noise Reduction in Statistic Iterative Tomographic Imaging".*
Deligne et al (US 6,622,117) teaches EM Algorithm for Convolution Independent Component Analysis (CICA).*

* cited by examiner

*Primary Examiner* — Tsung-Yin Tsai

(57) ABSTRACT

Embodiments of the present invention are directed to various enhanced discrete-universal denoisers that have been developed to denoise images and other one-dimensional, two-dimensional or higher-dimensional data sets in which the frequency of occurrence of individual contexts may be too low to gather efficient statistical data or context-based symbol prediction. In these denoisers, image quality, signal-to-noise ratios, or other measures of the effectiveness of denoising that would be expected to increase monotonically over a series of iterations may decrease, due to assumptions underlying the discrete-universal-denoising method losing validity. Embodiments of the present invention apply context-class-based statistics and statistical analysis to determine, on a per-context-class basis, when to at least temporarily terminate denoising iterations on each conditioning class. Each iteration of the iterative methods applies context-based denoising only for those conditioning classes that statistical analysis indicates remain valid for denoising purposes.

15 Claims, 34 Drawing Sheets

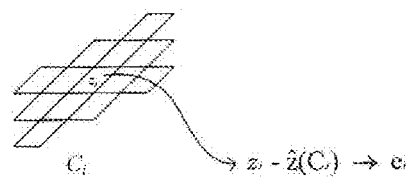
Figure 7
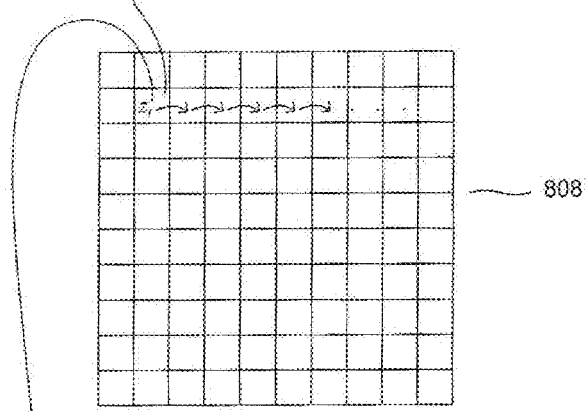
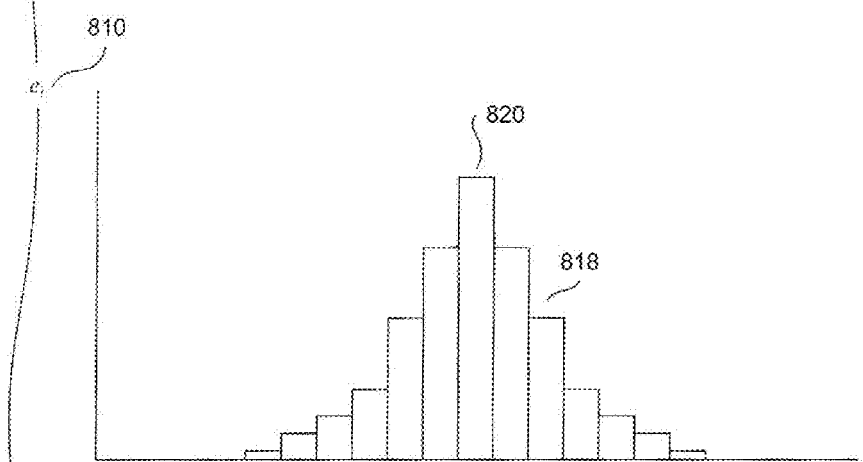
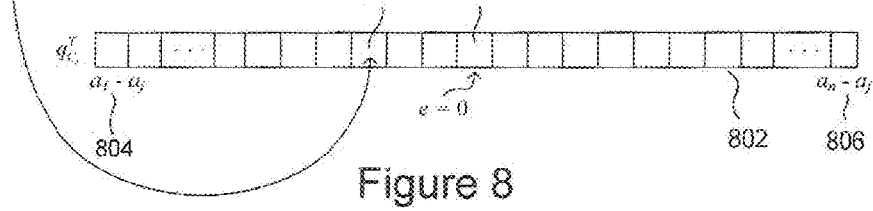
Figure 8

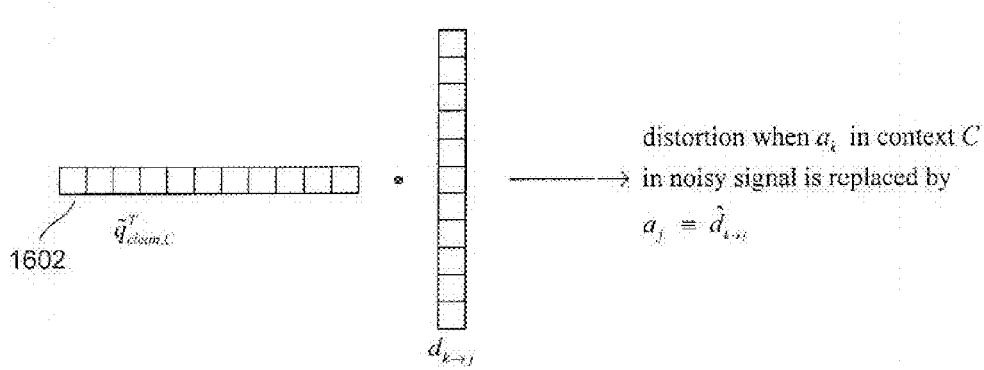
Figure 16
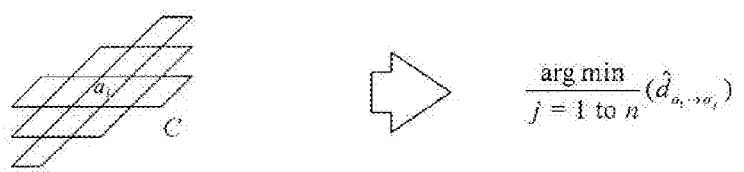
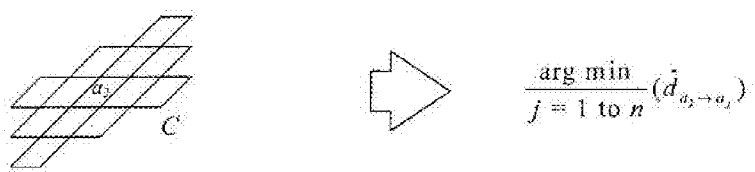
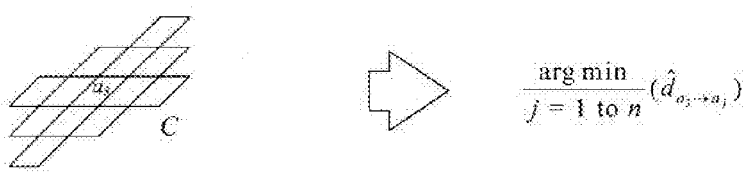
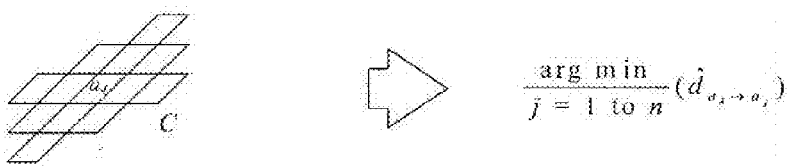
Figure 17

CONTEXT-CLUSTER-LEVEL CONTROL OF FILTERING ITERATIONS IN AN ITERATIVE DISCRETE UNIVERSAL DENOISER

TECHNICAL FIELD

The present invention is related to the detection and amelioration of noise and data and, in particular, to a method and system for discrete universal denoising that uses statistics accumulated for conditioning classes to control filtering iterations at the context-class level during an iterative discrete-universal-denoising procedure.

BACKGROUND OF THE INVENTION

Whenever information is electronically encoded as original, or clean, data, and then transferred from the data source to a data destination, noise may be introduced into the data by the transfer process, resulting in alteration of the original, clean data and reception of the data by the data destination as noisy data. For example, when information is electronically encoded as a sequence of binary bits and sent through a communications network, such as a local Ethernet, to a destination node, there is a small probability that any given bit within the original, or clean, sequence of binary bits ends up being corrupted during transfer through the Ethernet, resulting in a "0" bit in the clean data being altered to a "1" bit in the noisy data received at the destination node, or a "1" bit in the clean data altered to a "0" bit in the noisy data received at the destination node. Although electronic communications media are classic examples of noisy channels, almost any type of data transfer, data storage, or data manipulation may result in data corruption, and therefore may be modeled as a noisy channel. For example, there is a small probability, associated with each bit of a block of binary data, that the bit will be altered when the block of data is stored and then retrieved from a hard disk, or even when the block of data is transferred from local cache memory to global random-access memory within a computer system. In general, redundant data, including check sums and cyclical redundancy codes, are embedded into data encodings to allow corrupted data to be detected and repaired. However, the amount of redundant data needed, and the accompanying costs and inefficiencies associated with redundant data, grows as the acceptable level of undetectable and/or unrepairable data corruption decreases.

In many cases, data corruption may occur prior to a point in a process at which redundant information can be embedded into a data signal to facilitate error detection and correction. As one example, a scanner that optically scans a printed document to produce a digital, electronic encoding of an image of the document can be viewed as a noisy channel in which discrepancies between the digitally encoded image of the document and the original document may arise. Such discrepancies may be introduced by a variety of optical and electronic components within the scanner that focus an optical image of the document onto a light-detecting component that transforms the detected optical image into an electronically encoded image of the document. When the digitally encoded image of the document is displayed or printed, different types of noise may be perceived as graininess, irregularities along the edges of text characters or objects within graphical images, uneven shading or coloration, random speckling, or other such visually distinguishable differences between the printed or displayed version of the digitally encoded data and the original document.

Denoising techniques can be applied to a noisy, digitally encoded image in order to produce a denoised, digitally encoded image that more accurately represents the original document that was scanned to produce the noisy, digitally encoded image. Denoising techniques may also be applied to data received over channels that are too noisy for recovery of the original data using the redundant data incorporated within the data to facilitate error correction. A wide variety of additional applications of denoising techniques have been identified and are well known. Recently, a discrete universal denoiser method ("DUDE") has been developed for denoising the noisy output signal of a discrete, memoryless data-transmission channel without relying on knowledge of, or assumptions concerning, the statistical properties of the original, or clean, signal input to the discrete, memoryless channel. Even more recently, the DUDE method has been extended for denoising continuous tone images, such as scanned documents or images. The extended DUDE method is referred to as the "DUDE-CTI method," or simply as the "DUDE-CTI." The DUDE-CTI method is intended for use in a variety of image and data scanning, processing, and transfer applications. The DUDE-CTI method has shown promising results for certain types of noisy channels. An efficient DUDE-CTI depends on collections of symbol-occurrence statistics for each of a large number of different pixel contexts observed within an image. Because of the large number of possible contexts, an expedient approach is to coalesce individual contexts into groups, or classes, of contexts, and to then collect statistics on a context-class basis, rather than for individual contexts.

In various embodiments of the DUDE-CTI method, and other denoising methods, it is desirable, when possible, to prefilter a noisy image in order to remove, as far as possible, various types of noise that can be ameliorated by context-dependent filtering or denoising prior to applying the more complex, global, and statistical DUDE-CTI and DUDE methodologies. In the DUDE-CTI method, and even more recent, enhanced discrete-universal-denoising methods for denoising images and other two-dimensional and higher-dimensional data sets, the discrete-universal-denoising method is iterative. Each iteration produces a next filtered image from which contexts are determined for a next subsequent application of the method. In currently available iterative discrete-universal-denoising methods, iteration continues until one of several possible global convergence criteria are satisfied. However, in certain cases, image quality, signal-to-noise ratios, or other measures of denoising effectiveness do not increase, but may, in fact, decrease with additional iterations. Information-theory researchers, denoising-method developers, and manufacturers and users of a variety of data acquisition, data-storage, data-processing, and data-transfer devices that employ denoisers, continue to seek iterative, enhanced discrete-universal denoisers that efficiently produce optimally or near-optimally denoised data sets.

BRIEF DESCRIPTION OF THE DRAWINGS

FIG. 7 illustrates computation of an error $e_i$ for a symbol $z_i$ observed within a context $C_i$ in noisy signal.

FIG. 8 illustrates accumulation of error information for a particular context during analysis of a noisy image signal.

FIG. 16 illustrates the computation of an estimate of the distortion produced by replacing symbol $a_k$ within context C in a noisy signal by the replacement symbol $a_j$.

FIG. 17 illustrates a symbol-replacement function g(C,z).

DETAILED DESCRIPTION OF THE INVENTION

Embodiments of the present invention are directed to various enhanced discrete-universal denoisers that have been developed to denoise images and other one-dimensional, two-dimensional or higher-dimensional data sets in which the frequency of occurrence of individual contexts may be too low to gather efficient statistical data or context-based symbol prediction. In these denoisers, image quality, signal-to-noise ratios, or other measures of the effectiveness of denoising that would be expected to increase monotonically over a series of iterations may decrease, due to assumptions underlying the discrete-universal-denoising method losing validity. Embodiments of the present invention apply context-class-based statistics and statistical analysis to determine, on a per-context-class basis, when to at least temporarily terminate filtering iterations on each conditioning class. Each iteration of the iterative methods applies context-based denoising only for those conditioning classes that statistical analysis indicates remain valid for denoising.

In a first subsection, denoising and the DUDE and DUDE-CTI denoising methods are first described, with reference to FIGS. 1-20, in order to provide a basis for understanding the present invention. Embodiments of the present invention are discussed in a following subsection.

Denoising and the DUDE and DUDE-CTI Denoising Methods

Figure 1:
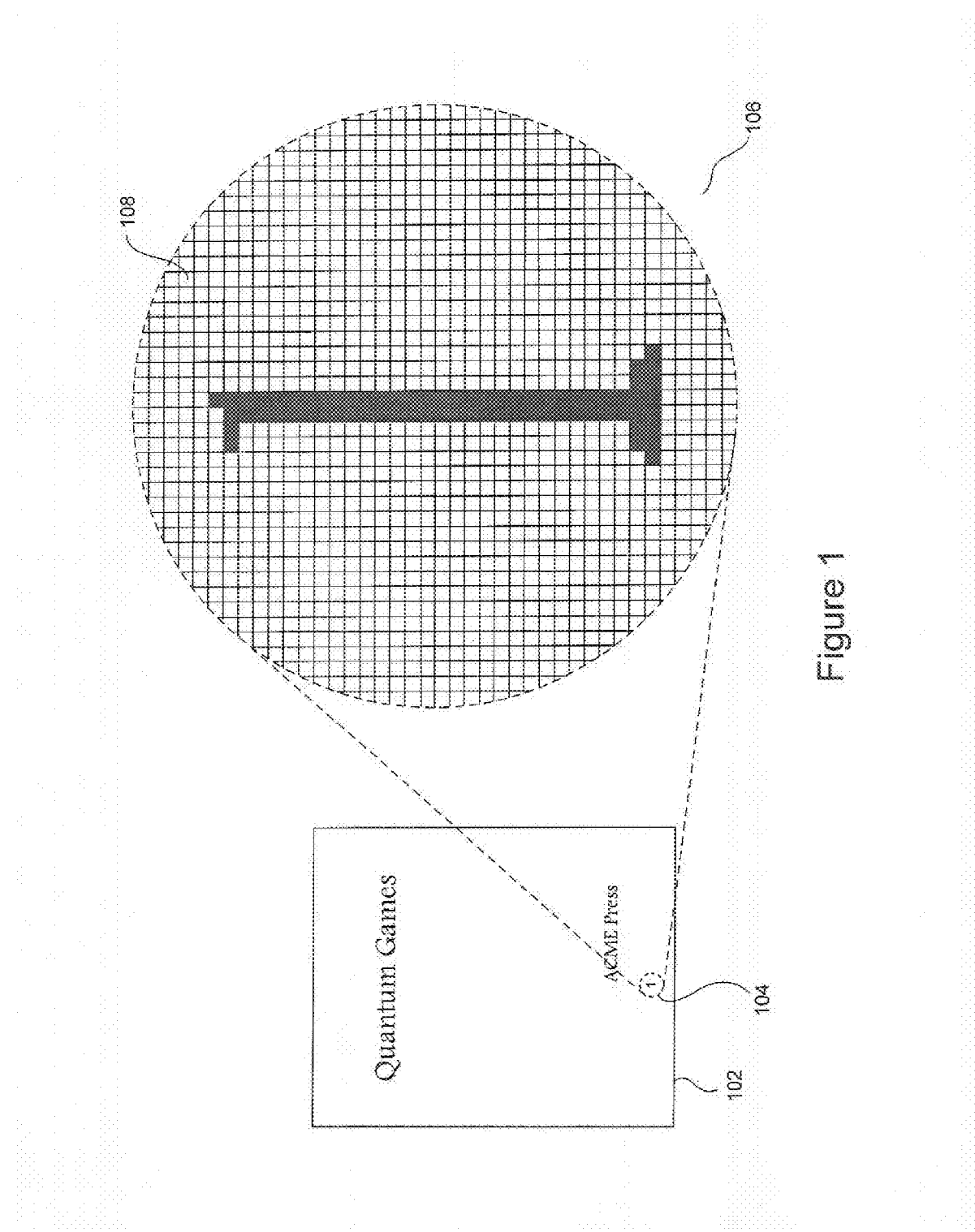
FIG. 1 illustrates digital encoding of a printed document to produce a clean image signal.

FIG. 1 illustrates digital encoding of a printed document to produce a clean image signal. In FIG. 1, a displayed image 102 of a digitally encoded title page is shown, with a small disk-like region 104 of the displayed document shown at a higher magnification 106. The document is displayed as an array of square pixels, such as pixel 108, and the digital encoding of the document comprises a sequence of integers, each integer representing an intensity value of a corresponding pixel. Commonly, for multi-level document images, pixel values range over a grayscale range from 0, indicating black, to 255, indicating white, with a continuous range of intermediate gray tones encoded by the integers 1-254. The integers 0-255 can therefore be considered to be symbols of a 256-symbol alphabet. Different techniques may be used to encode colored images. In one technique, three different grayscale-like encodings are used to encode intensity values of three primary colors, and the three different encodings are simultaneously displayed or rendered by a three-primary-color display or rendering device. Alternatively, a larger range of integer values may be used to encode a full range of color and intensity values in a single integer field. Thus, a pixel corresponds to a small region of a displayed or printed image, and the integer value associated with a pixel in a digitally encoded image represents the intensity, or both the color and intensity, for display or rendering of the pixel on a display or rendering device.

Figure 2:
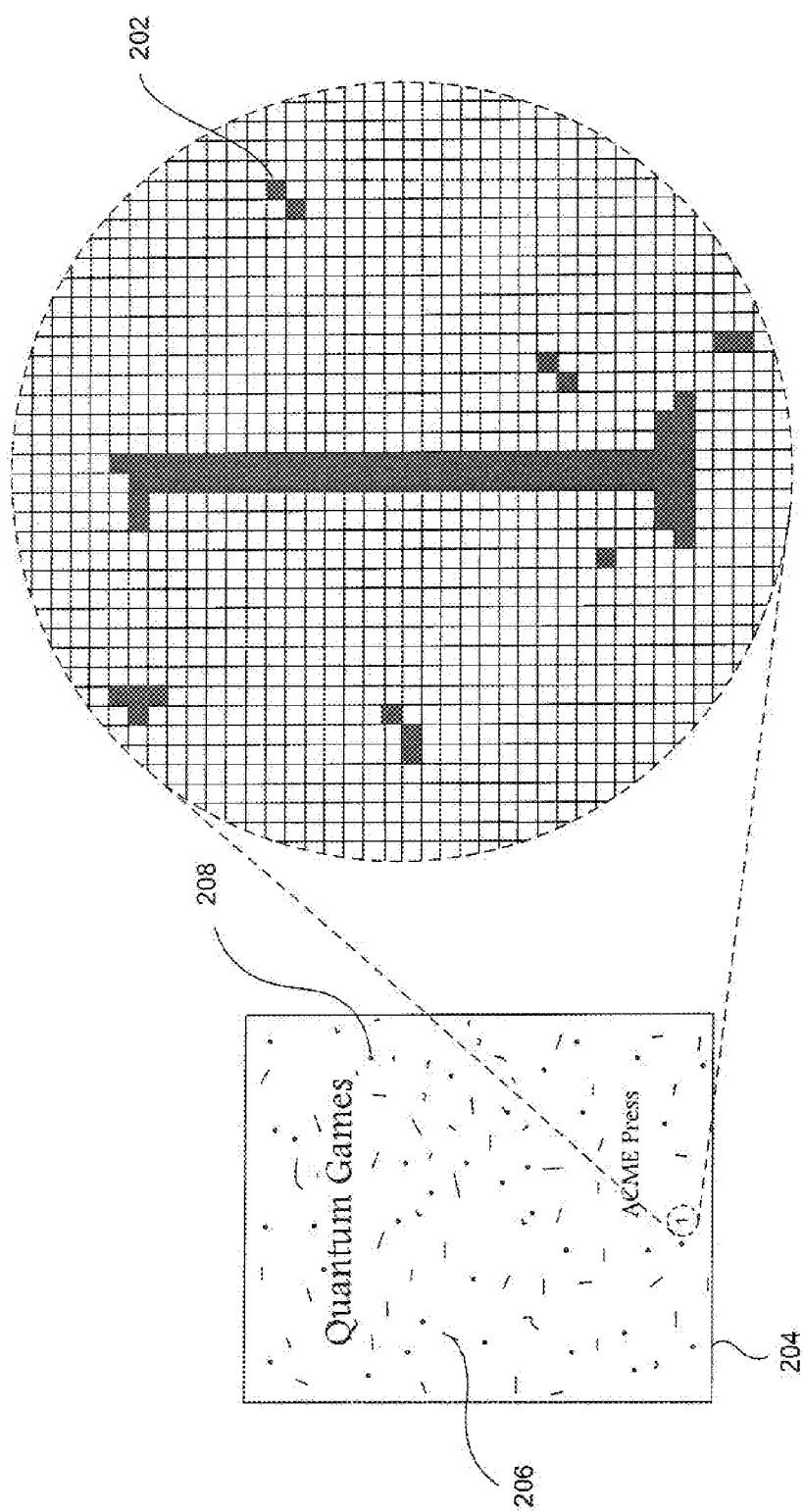
FIG. 2 illustrates a noisy signal corresponding to the clean image signal discussed with reference to in FIG. 1.

A printed document that is to be scanned by a scanning device can be considered as a clean signal. In other words, the printed document can be viewed as a large set of pixel-intensity values that, when displayed or printed, would appear visually indistinguishable from the original, printed document. The pixel data actually obtained as a result of scanning may be considered to be a noisy signal. FIG. 2 illustrates a noisy signal corresponding to the clean image signal discussed with reference to in FIG. 1. In comparing FIG. 2 to FIG. 1, it is easily observed that a number of pixels, such as pixel 202, have intensity values different from the values that the pixels would be expected to have based on the original, clean image shown in FIG. 1. The corresponding noisy image 204 is seen to have a number of visually discernable distortions, such as streaks 206 and speckles 208. In a scanning application, the original document represents the clean image signal, and the digitally encoded document produced by scanning the original document represents the noisy image signal. In various other applications, the clean signal may be an initial, digitally encoded document or other information source, and the noisy signal may be the corresponding digitally encoded document or other information source received following transmission of the clean signal through a communications medium or retrieved following storage of the clean signal in a volatile or non-volatile electronic data-storage device.

Figure 3A:
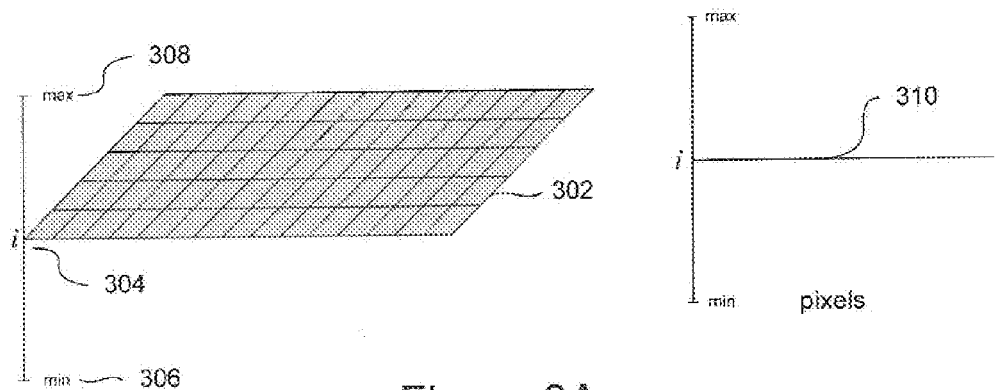
FIGS. 3A-C illustrate salt-and-pepper noise and Gaussian noise.
Figure 3B:
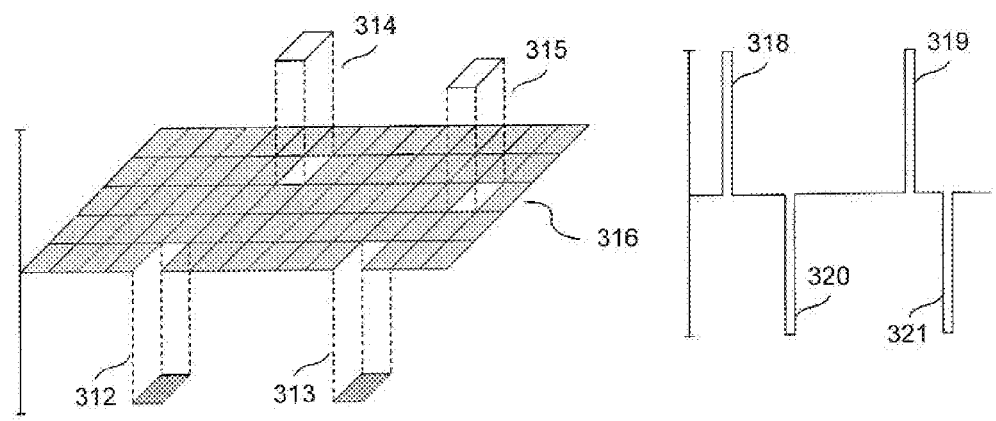
Figure 3C:
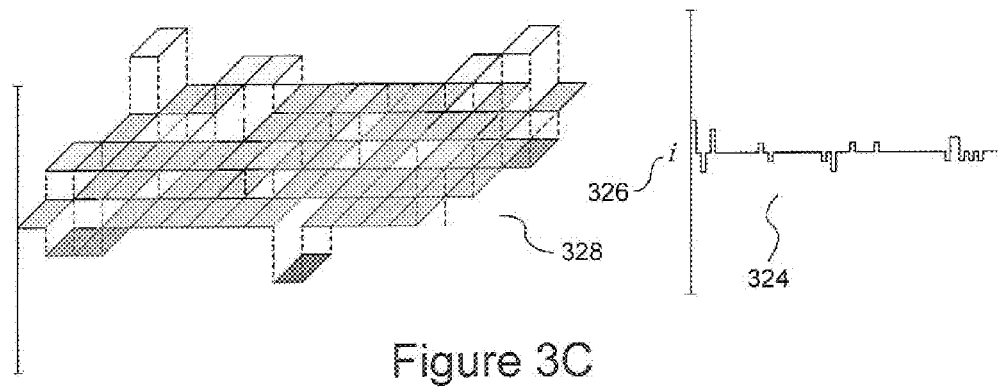

FIGS. 3A-C illustrate salt-and-pepper noise and Gaussian noise. FIG. 3A shows a small portion of a digitally encoded image 302, all pixels of which have a uniform intensity value i 304 with respect to a range of pixel-intensity values from a minimum value (306 in FIG. 3) to a maximum value (308 in FIG. 3). A two-dimensional graph of the intensity values of individual pixels from the region, in which pixels are taken in some particular order from the two-dimensional image, produces a straight, horizontal line 310. FIG. 3B illustrates salt-and-pepper noise added to the small region of uniform pixel intensity shown in FIG. 3A. Salt-and-pepper noise can be modeled as independent probabilities, associated with each pixel, that the intensity value associated with the pixel is altered, or corrupted, by a noisy channel to have either a minimum intensity value or a maximum intensity value. In FIG. 3B, two pixels 312-313 have intensity values altered to the minimum intensity value and two pixels 314-315 have intensity values altered to the maximum intensity value. A two-dimensional graph of the pixel intensity values for the pixels of the small region 316 of an image with added salt-and-pepper noise is seen to exhibit a number of narrow spikes 318-321 corresponding to pixels with altered, or corrupted, intensity values. FIG. 3C illustrates Gaussian noise added to the small region of uniform pixel intensity shown in FIG. 3A. Gaussian noise may be modeled as the addition of a value of an independent Gaussian random variable, associated with each pixel, to the pixel intensity value of the pixel. In one convenient mathematical model, the Gaussian random variables are considered to be independent, and to be identically distributed. Actual Gaussian-like noise produced by various types of noisy channels may not exhibit independent and identical distributions of alterations in pixel intensities, but a model employing independent and identically distributed Gaussian random variables often serves as a reasonable approximation for different types of Gaussian-like noise, and provides a tractable and computable mathematical framework for analysis of the noise. A two-dimensional graph of the pixel intensity values of the small region of an image shown in FIG. 3A with added Gaussian noise shows random fluctuations 324 about an expected pixel intensity i 326 for the small region of the image 328.

A discrete universal denoiser for continuous-tone images ("DUDE-CTI") has been developed for general denoising of digitally encoded images, and other noisy data. The DUDE-CTI method is next described, as one practical application for denoising methods that represent embodiments of the present invention.

Figure 4A:
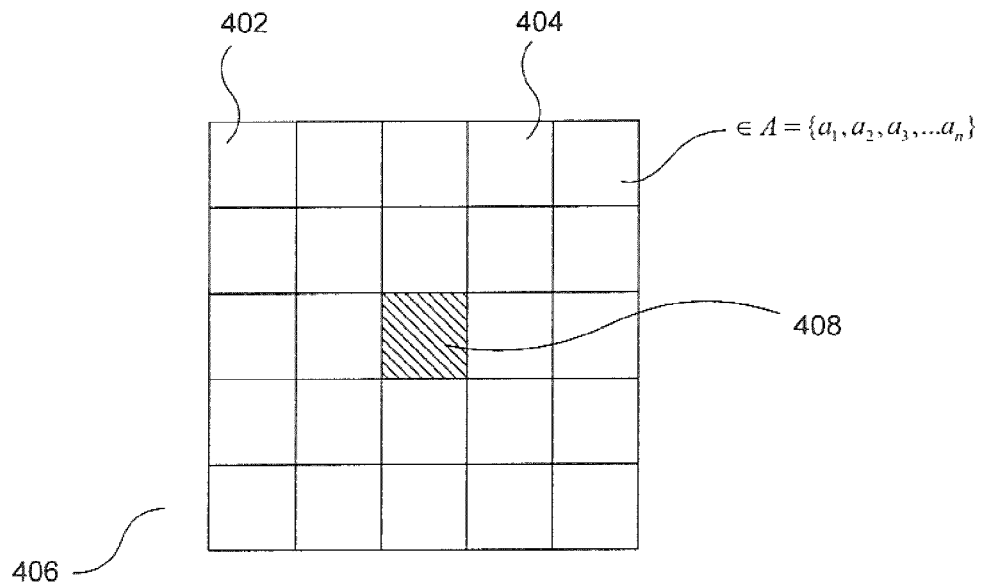
FIGS. 4A-B illustrate two different, well defined context neighborhoods that may be employed during analysis and denoising of image signals.
Figure 4B:
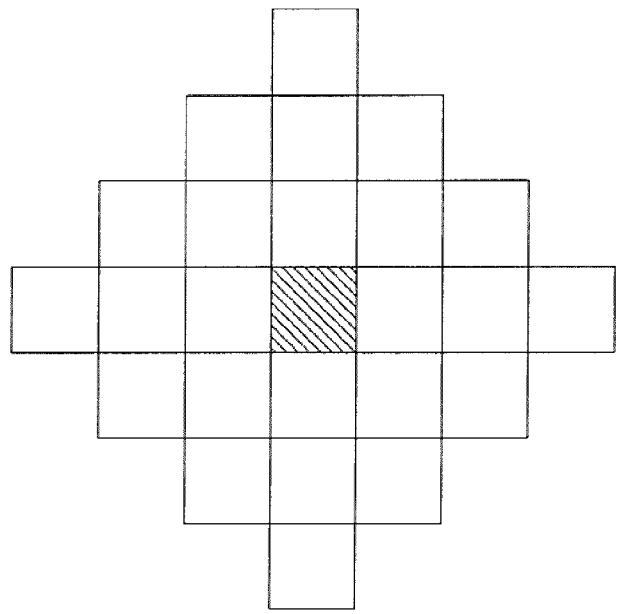

In both the DUDE-CTI and other context-based denoisers, an image signal, or digitally encoded image, is considered to be a two-dimensionally-ordered sequence of symbols, each symbol mapped to one of a finite set of numerical values. Most of the symbols in a signal have well-defined two-dimensional contexts, or neighborhoods, and these contexts play a significant role in both the DUDE-CTI and other denoisers. FIGS. 4A-B illustrate two different, well defined contexts that may be employed during analysis and denoising of image signals. Each square, such as square 402 in FIG. 4A, represents a single pixel intensity value within an image signal. As shown in FIG. 4A, the pixel intensity value associated with a pixel, such as the pixel intensity value associated with pixel 404, is considered during analysis and denoising as a symbol $z_i$ chosen from a finite alphabet $A \equiv \{a_1, a_2, a_3, \ldots a_n\}$ where the index i indicates the order, or position, of the pixel within the signal. The pixel intensity value, or symbol $z_i$, associated with pixel i may be any one of the symbols in alphabet A. For common encodings of multi-level images, the symbols in A, $\{a_1, a_2, a_3, \ldots a_n\}$, are the unsigned, single byte values 0, 1, ..., 255. In each of several passes, the DUDE-CTI and other denoisers consider each symbol within a signal with respect to the symbol's context. The context 406 shown in FIG. 4A for a currently considered pixel, or central symbol, 408 comprises the pixel values contained in a 5×5 square region surrounding the currently considered pixel 408, but not including the currently considered pixel. In other words, the context for symbol 408 comprises the values of the 24 nearest symbol neighbors within the image signal containing currently considered symbol 408. In the discussion of the DUDE-CTI denoiser, the currently considered symbol, such as symbol 408 in FIG. 4A, is referred to as the "central symbol" of the context surrounding the symbol, but the context is not considered to include the central symbol.

Many different context shapes and sizes are possible. FIG. 4B shows an alternative 24-symbol context for an image signal. In general, the useful information content per symbol of a context may increase with increasing size up to a context size of maximum useful information per symbol, and then decrease with context sizes greater than the context size of maximum useful information per symbol. Analysis and denoising of noisy signals involves frequent context-based computations, with execution times increasing with increases in the context size employed in the analysis. Therefore, efficiency constraints may constrain context sizes to sizes, in symbols, below the maximum useful information per symbol size. Moreover, the maximum useful information per symbol context size may vary with the image signals being denoised.

Figure 5A:
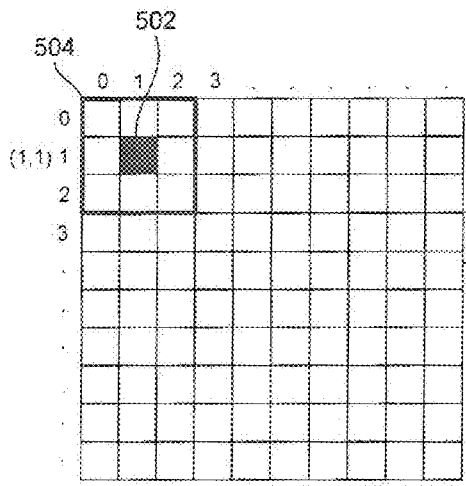
FIGS. 5A-D illustrate context usage during analysis and denoising of noisy signals.
Figure 5B:
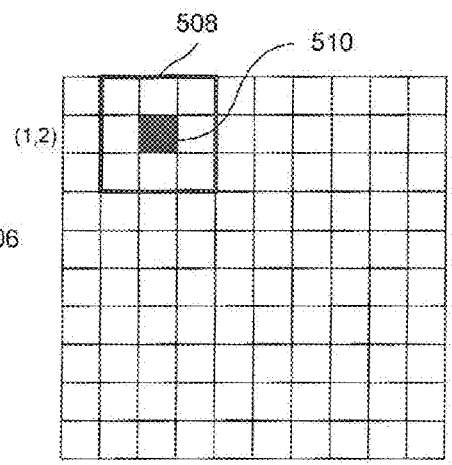
Figure 5C:
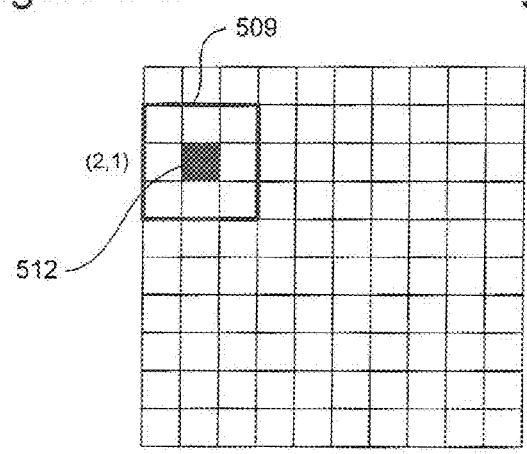
Figure 5D:
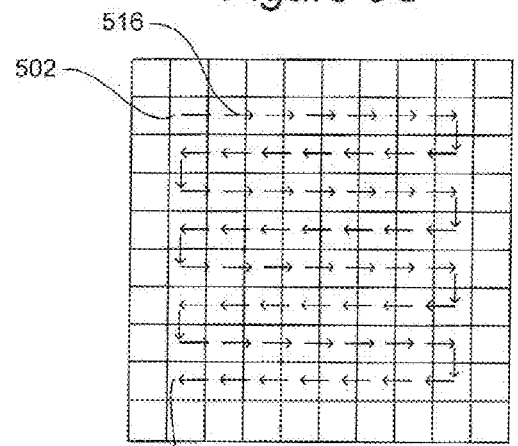

FIGS. 5A-D illustrate context usage during analysis and denoising of noisy signals. In FIG. 5A, the uppermost and leftmost symbol 502 with a full, 3×3 symbol context 504 within a small, square image 506 is shown. In certain types of analysis and denoising, special contexts are used for edge symbols, such as the first and last symbols of each row and column of the image. In other techniques, including the technique illustrated in FIGS. 5A-D, only symbols with full contexts are analyzed. FIGS. 5B and 5C show the 3×3 contexts 508 and 509 around the next rightmost symbol 510 and the next lowest symbol 512 with respect to symbol 502 in FIG. 5A. As shown in FIG. 5D, a given pass, or stage, of analysis or denoising may involve successive consideration of each full-context symbol within an image signal, starting with a first symbol 502 and proceeding to a final symbol 514. In FIG. 5D, small arrows, such as arrow 516, indicate each step of a pass in which each symbol is considered. In alternate techniques, all of the symbols within a signal may be considered, with specialized asymmetrical contexts employed for those symbols lacking a full context, or neighborhood.

Images are generally 2-dimensional data sets, and analysis and denoising methods for images therefore frequently use 2-dimensional contexts symmetrically disposed with respect to the central symbol. In other types of data sets, other types of contexts may be appropriate. For example, in digitally encoded text files, comprising essentially a one-dimensional series of symbols, a single length of symbols that include the central symbol may be employed as a context. Other types of signals may profitably employ more complex, non-contiguous or higher-dimensional contexts.

Figure 6:
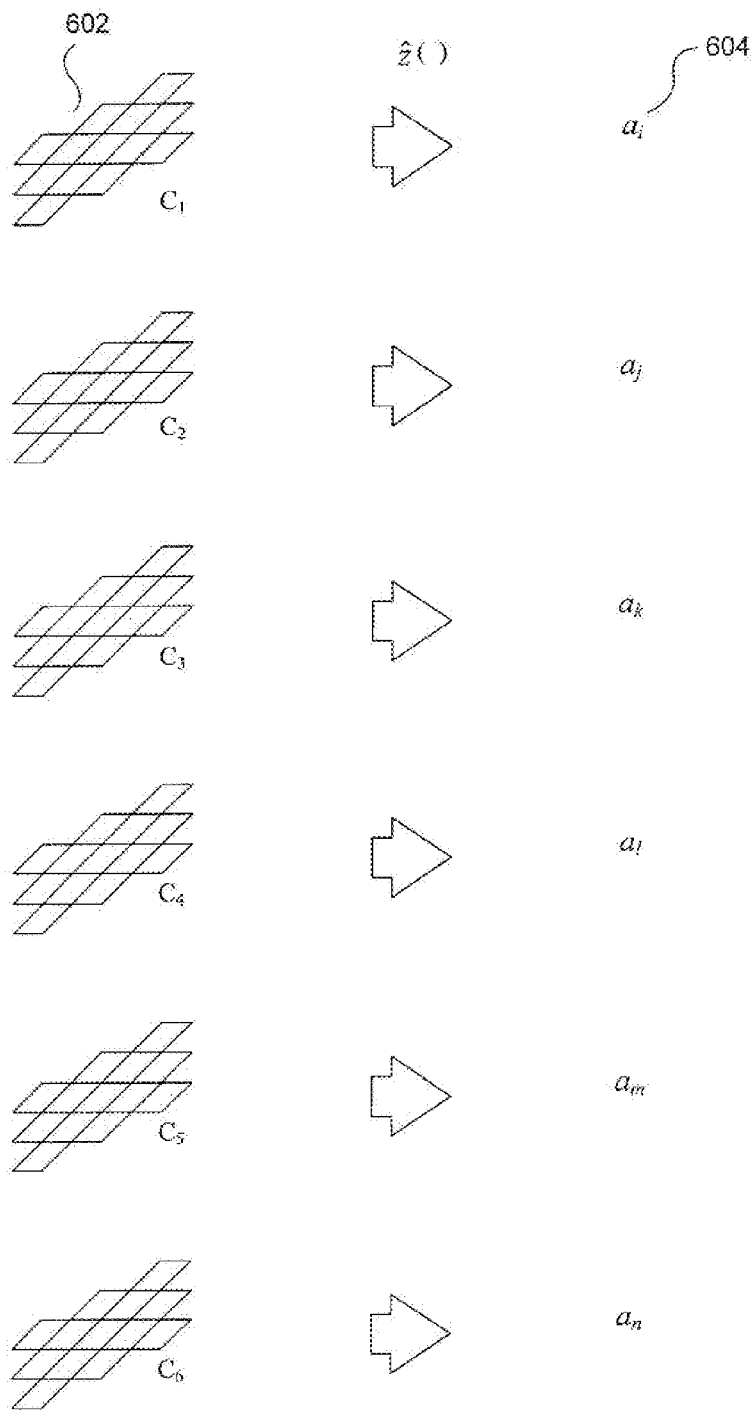
FIG. 6 illustrates the predictor function $\hat{z}(\ )$.

The DUDE-CTI method employs a central-symbol predictor function $\hat{z}()$. FIG. 6 illustrates the predictor function $\hat{z}()$. As illustrated in FIG. 6, the $\hat{z}()$ function receives, as a sole argument, a context, such as context $C_i$ 602 in FIG. 6, from a noisy signal and returns a symbol 604 predicted to be the central noisy symbol. In other words, as shown in FIG. 6, for each possible context that may occur in a noisy signal, the predictor functions $\hat{z}()$ returns a corresponding central symbol for the context.

The DUDE-CTI method computes an error $e_i$ for each symbol $z_i$ in the noisy signal as the difference between the observed symbol $z_i$, and the symbol predicted by the predictor function $\hat{z}()$ for the context $C_i$ for the symbol $z_i$. FIG. 7 illustrates computation of an error $e_i$ for a symbol $z_i$, observed within a context $C_i$ observed in a noisy signal.

FIG. 8 illustrates accumulation of error information for a particular context during analysis of a noisy image signal. The error-information accumulation in FIG. 8 is context specific. As discussed later, more efficient DUDE-CTI implementations use cluster-specific error-information accumulation. As shown in FIG. 8, a data structure, or vector, $q_{C_i}^T$ 802 is maintained for each possible context $C_i$ in order to count the occurrences of different possible error values computed for the context $C_i$ during analysis of a noisy image signal. If the predictor function $\hat{z}(C_i)$ predicts the symbol $a_j$ for context $C_i$, then, according to the error equation $e_i=z_i-\hat{z}(C_i)$, the error values that can be computed for context $C_i$ range from $a_1-a_j$ 804 to $a_n-a_j$ 806.

In a first pass of the DUDE-CTI denoiser, each symbol in a noisy image signal 808 is considered, and the error for each considered symbol is tabulated in the appropriate vector $q_C^T$ for that symbol. For example, in FIG. 8, an error $e_i$ 810 is computed from the first considered symbol $z_i$ 812 and associated context $C_i$, and the computed error $e_i$ is used to compute the position of a counter 814 within the vector $q_{C_i}^T$ 802 that is updated to reflect the occurrence of error $e_i$ in the noisy image signal 808. The computed error $e_i$ 810 can be viewed as being offset from a counter 816 within the vector $q_{C_i}^T$ 802 corresponding to a computed error of 0. As each symbol is considered during the first pass of the DUDE-CTI method, the vector $q_C^T$ corresponding to the observed context of the symbol is updated to reflect the occurrence of the error e computed from the symbol and context observed for the symbol within the noisy image signal. After the first pass of the DUDE-CTI method, each vector $q_C^T$ generally stores a histogram more or less symmetrically disposed about the counter within the vector $q_C^T$ corresponding to a computed error value e of 0. For example, in FIG. 8, the contents of the counters within vector $q_{C_i}^T$ 802 are plotted above the vector $q_{C_i}^T$ in a two-dimensional plot 818, and form a histogram with a central, highest peak 820 corresponding to the counter 816 within vector $q_{C_i}^T$ 802 representing a computed error of 0. In other words, the symbol predicted by the predictor function $\hat{z}()$ for a given context $C_i$ is generally the symbol most often observed within the context $C_i$ in the noisy signal. Thus, following the first pass of the DUDE-CTI denoiser method, histograms of observed errors for each context are collected.

Unfortunately, when contexts of even modest size are used, a typical image will not contain a sufficient number of occurrences of each context to collect reliable, well-formed histograms of error occurrences, such as the histogram shown in FIG. 8. For this reason, the DUDE-CTI method employs context clustering in order to collect sufficient numbers of error occurrences for each context.

Figure 9:
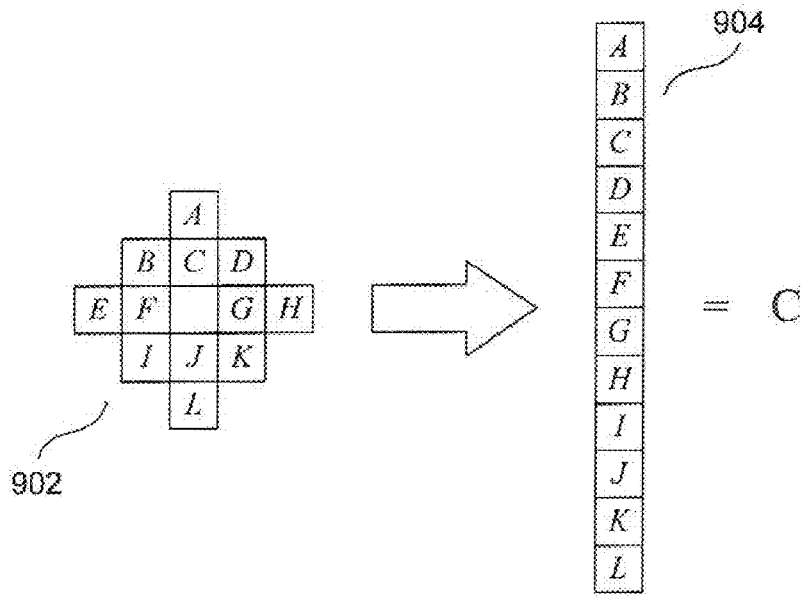
FIG. 9 illustrates a context vector.

FIG. 9 illustrates a context vector. It is convenient to consider context vectors for the mathematical steps of the DUDE-CTI method. As shown in FIG. 9, the symbols that occur within a context 902 may be ordered into a vector 904 according to some ordering method that is uniformly applied to all contexts. In FIG. 9, symbols A-L from 2-dimensional context 902 are re-ordered into a column vector 904 by a left-to-right, top-down traversal of the 2-dimensional context 902. The ordering method is arbitrary, and different ordering methods may be mathematically or programmatically convenient for different types of contexts. A context vector may be considered to be a row vector or a column vector, depending on conventions chosen for the analysis using the context vector. In other words, the convention is arbitrary.

Figure 10:
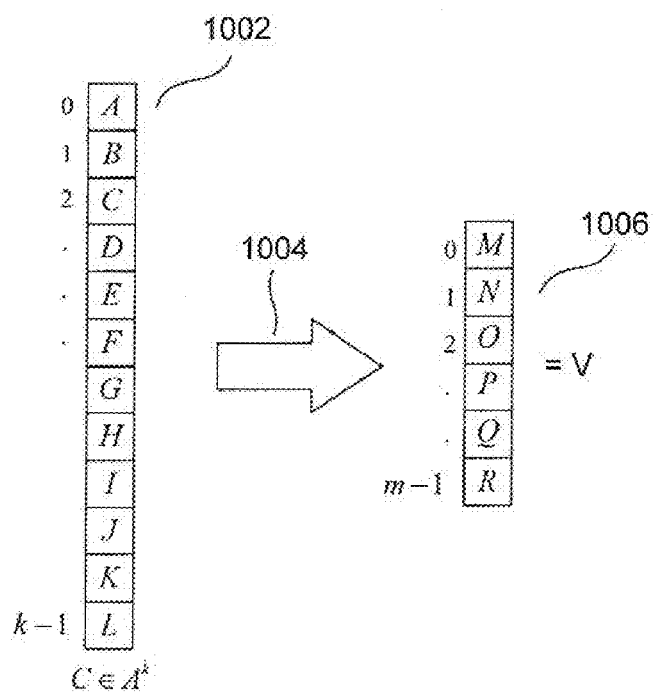
FIG. 10 illustrates a context-vector to cluster-index mapping.

Context clustering can be thought of as a many-to-one mapping, or binning, of context vectors in a context-vector space into a set of context-cluster indices. FIG. 10 illustrates a context-vector to cluster-index mapping. In FIG. 10, a context vector 1002 $C \in A^k$ of dimension k is mathematically transformed 1004 to a cluster index V 1006 with a range of values expressible using a sequence of m symbols over some alphabet (e.g. binary), where m is less than the dimension k of the context vector.

Figure 11:
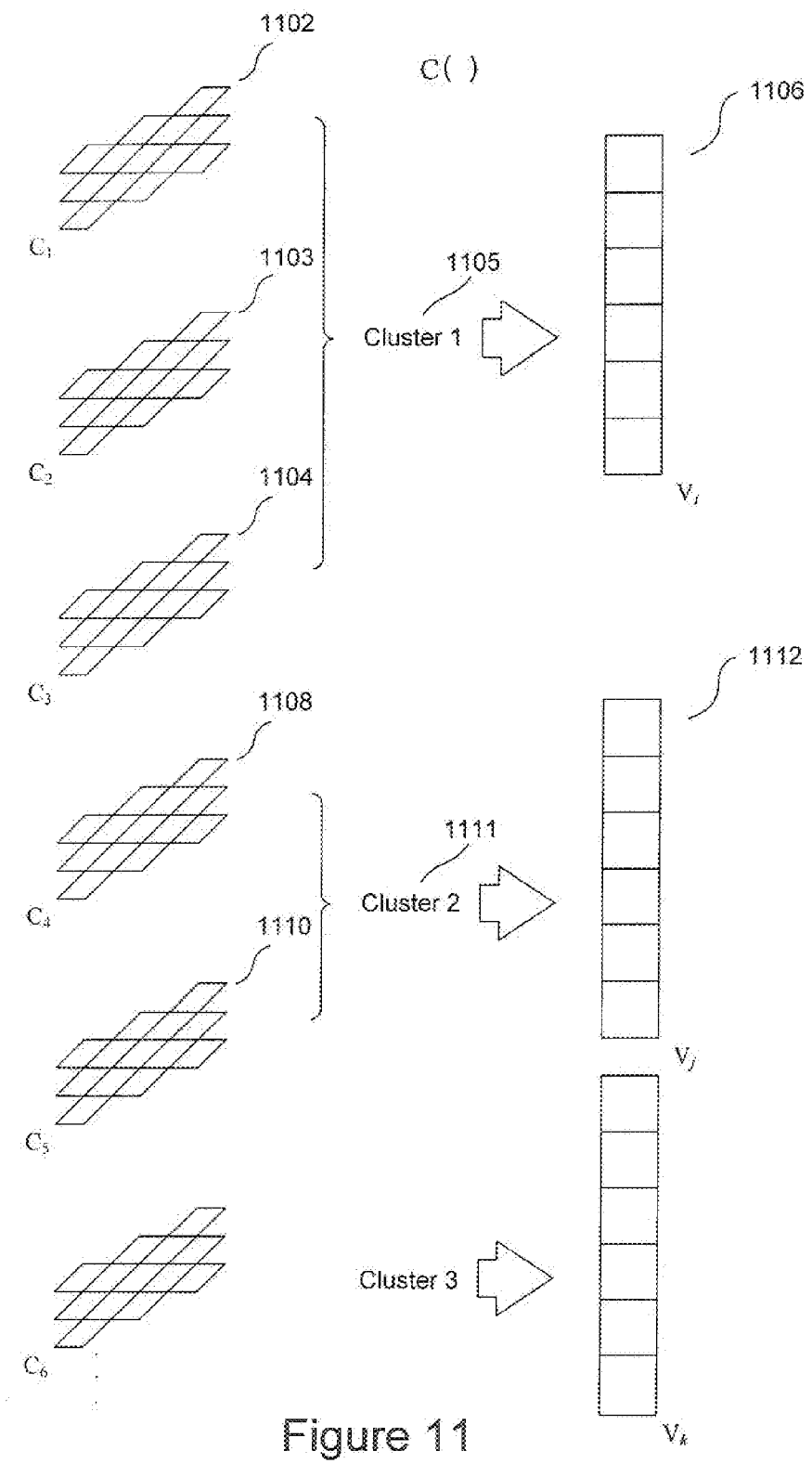
FIG. 11 illustrates a context-clustering function C( ) used by various embodiments of the DUDE-CTI denoising method.

FIG. 11 illustrates a context-clustering function $C()$ used by various embodiments of the DUDE-CTI denoising method. As shown in FIG. 11, the context-clustering function $C()$ maps a given context, supplied as a sole argument, that is expected to produce a particular type of error histogram to a particular cluster to which other contexts that are expected to produce similar error histograms may be mapped. The context is, in turn, mapped to a cluster index. Multiple contexts are generally mapped to any given cluster by the context-clustering function $C()$. For example, in FIG. 11, three contexts 1102-1104 are mapped by the context-clustering function $C()$ to Cluster 1 1105, in turn mapped to, or associated with, cluster index $V_i$ 1106. Similarly, contexts 1108 and 1110 are both mapped by the context-clustering function $C()$ to Cluster 2 1111, in turn mapped to, or associated with, cluster index $V_j$ 1112. The number of contexts mapped to any particular cluster may vary, depending on the context-clustering function $C()$. Any particular DUDE-CTI embodiment may use any of a number of different context-clustering functions, although suitable context-clustering functions generally have the property of mapping contexts expected to produce similarly shaped error histograms, such as the error histogram shown in FIG. 8, to a common cluster. In other words, all the contexts mapped to any particular cluster by a suitable context-clustering function would produce similarly shaped error histograms were the first pass of the DUDE-CTI method executed on a sufficiently large noisy image signal to collect sufficient occurrence counts of errors for each context to generate well-formed histograms for each context.

Figure 12:
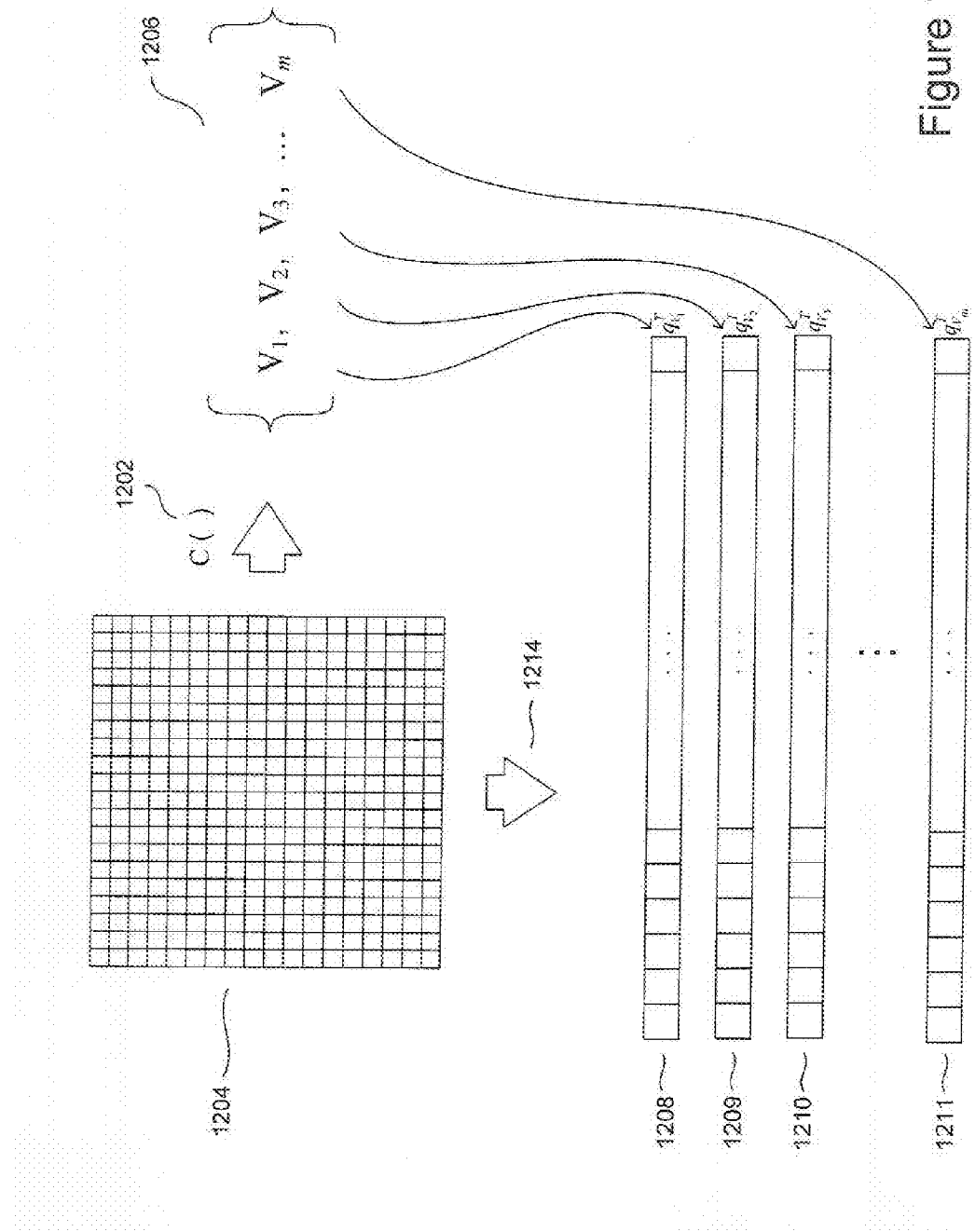
FIG. 12 illustrates the use of clustering by the DUDE-CTI method during a first pass, in which error histograms are prepared.

FIG. 12 illustrates the use of clustering by the DUDE-CTI method during a first pass, in which error histograms are prepared. As shown in FIG. 12, a context-clustering function $C()$ 1202 is employed to map contexts occurring within a noisy image signal 1204 to a set of clusters 1206. Then, an occurrence-count vector $q_{V_iT}$ 1208-1211 is instantiated and initialized for each possible cluster $V_i$. Finally, each symbol in the noisy image signal 1204 is analyzed 1214 in the first pass to compute and tabulate the occurrence of computed errors, on a cluster-by-cluster basis. The errors are computed as discussed above, with reference to FIGS. 7 and 8, except that all errors observed for all contexts that belong to a given cluster $V_i$ are commonly tabulated together in the vector $q_{V_i}^T$ for that cluster, rather than being separately tabulated in context-associated vectors $q_C^T$, as was done in FIG. 8. Thus, clustering allows a much larger number of error occurrences to be tabulated together in each histogram generated during analysis of a given noisy image signal. However, common tabulation of error occurrences in cluster-associated vectors $q_V^T$ is only meaningful if the shapes of the error histograms that would be separately produced for all contexts associated with the cluster are similar.

Figure 13:
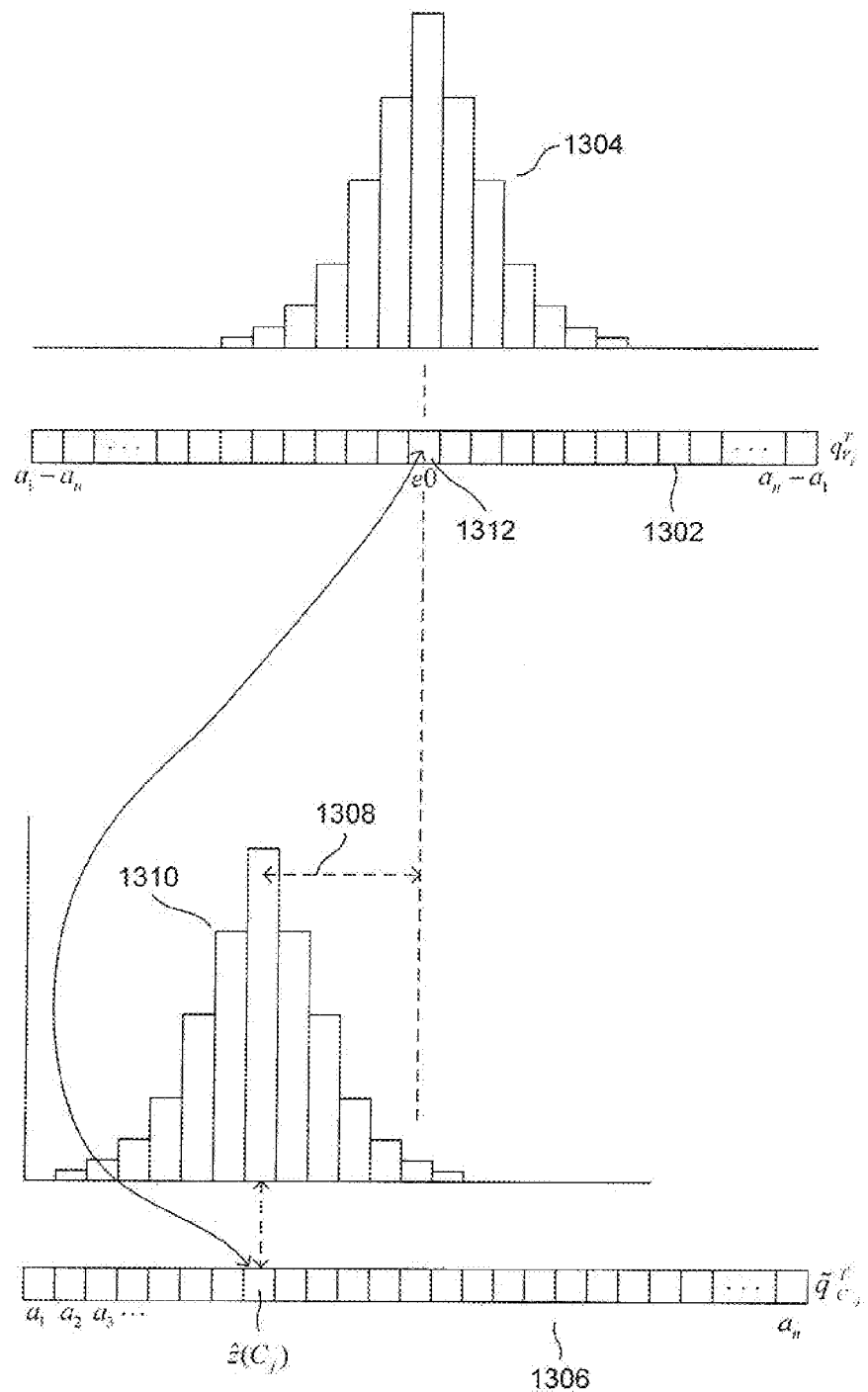
FIG. 13 illustrates generation of context-specific symbol-occurrence probability distributions $q_C^T$ from cluster-associated error-occurrence vectors $q_V^T$ collected during the first pass of a cluster-based DUDE-CTI method.

FIG. 13 illustrates generation of context-specific symbol-occurrence probability distributions $\tilde{q}_C^T$ from cluster-associated error-occurrence vectors $q_V^T$ collected during the first pass of a cluster-based DUDE-CTI method. In FIG. 13, a cluster-associated error-occurrence vector $q_{V_j}^T$ 1302 is shown at the top of the diagram, along with a histogram plot 1304 of the values stored in the counters within the cluster-associated vector $q_{V_j}^T$, using the illustration convention employed in FIG. 8. A context-specific symbol-occurrence probability distribution $\tilde{q}_{C_j}^T$ for a context $C_j$ associated with cluster $V_j$ 1304 is generated in FIG. 13 by copying the contents of the cluster-associated error-occurrence vector $q_{V_j}^T$ 1302 into the counters of context-associated context-specific symbol-occurrence probability distribution $\tilde{q}_{C_j}^T$. However, rather than copying the error-occurrence counts from cluster-associated vector $q_{V_i}^T$ into corresponding counters of context-associated context-specific symbol-occurrence probability distribution $\tilde{q}_{C_i}^T$, each copy involves an offset 1308, so that the context-specific probability distribution 1310 is centered about the symbol value $\hat{z}(C_j)$ predicted by the predictor function for the context, rather than centered at the position 1312 corresponding to a computed error of 0 in the cluster-specific histogram 1304. In other words, the final, context-specific vector $\tilde{q}_{C_i}^T$ represents a probability distribution for the occurrences of symbols $a_1, a_2, \ldots a_n$ from the alphabet A for all occurrences of the context $C_j$ in the noisy image signal, estimated from the probability distribution observed for the cluster to which the context is mapped by the context-clustering function C( ). The copy operation may therefore be accompanied by a normalization, to provide a normalized, estimated probability distribution, and a domain-related adjustment, since the domain of $q_{V_j}^T$ is generally twice as large as the symbol alphabet size n, which is the domain of $\tilde{q}_{C_j}^T$. Thus, the error-occurrence counts tabulated in common for each cluster are used to generate specific symbol-occurrence probability distributions $\tilde{q}_{C_j}^T$ for each context $C_j$.

Next, the DUDE-CTI denoiser generates a function g(C, z) that computes a replacement symbol $\hat{x}$ for a given central symbol z that occurs within context C observed in the noisy image signal. The replacement function g( ) can then be used in a second, symbol-by-symbol pass, to replace each symbol in the noisy image signal with a corresponding replacement symbol. The symbol replacement for each symbol in the noisy image signal is carried out independently. In other words, the contexts applied to the replacement function g( ) are the contexts observed in the noisy image signal, rather than partially symbol-replaced contexts. It should be noted that, in many cases, the replacement symbol $\hat{x}$ is identical to the corresponding observed symbol z in the noisy image signal.

Computation of the replacement function g( ) involves use of two matrices: (1) a matrix Π that represents a channel-noise model for the noise-inducing channel that generates symbol differences between the initial, clean image signal and the noisy image signal; and (2) a distortion matrix Λ that represents the distortions in a recovered image produced by substituting for symbol $a_i$ in the corresponding clean image signal any of the symbols $a_1, a_2, \ldots a_n$, in alphabet A.

Figure 14:
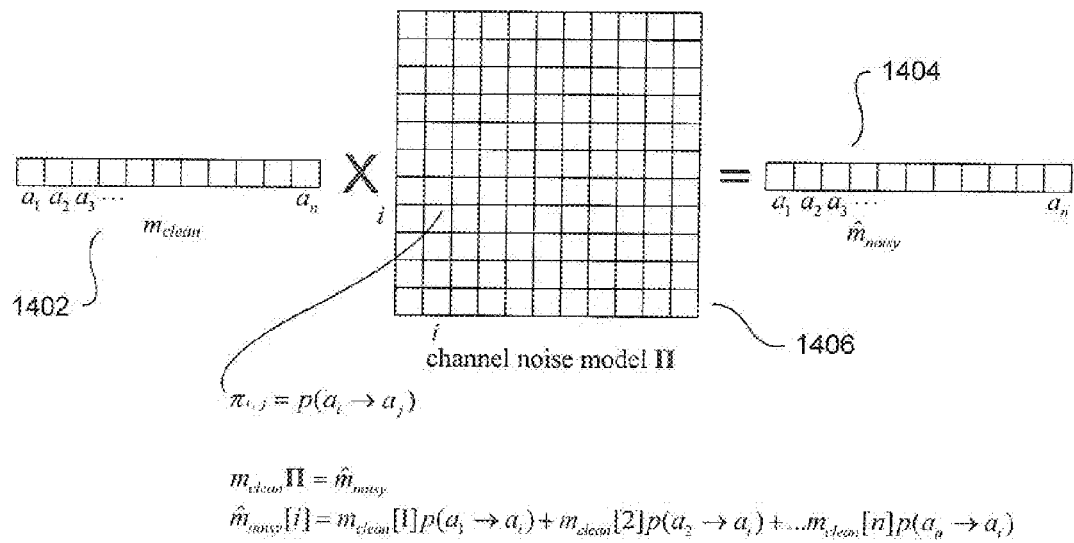
FIG. 14 illustrates a channel-noise-model matrix Π.

FIG. 14 illustrates a channel-noise-model matrix Π. In FIG. 14, the row vector $m_{clean}$ 1402 contains counts of the occurrences of each symbol in alphabet A within the clean, original image signal. The row vector $m_{clean}$ is indexed by symbols from the alphabet A, $a_1, a_2, a_3, \ldots$. A corresponding row vector $m_{noisy}$, contains the counts of occurrences of the symbols of the alphabet A in the noisy image signal. Multiplication of the row vector $m_{clean}$ by the channel-noise-model matrix Π 1406 produces a derived row vector $\hat{m}_{noisy}$ 1404. Each element $\pi_{i,j}$ of the channel-noise-model matrix Π contains the probability of the transition of the symbol $a_i$ to the symbol $a_j$ as the clean signal passes through the noisy channel modeled by the channel-noise-model matrix Π. In mathematical terms:

$$m_{clean}\Pi = \hat{m}_{noisy}$$

$$\hat{m}_{noisy}[i] = m_{clean}[1]p(a_1 \to a_i) + m_{clean}[2]p(a_2 \to a_i) + \ldots + m_{clean}[n]p(a_n \to a_i)$$

The derived vector $\hat{m}_{noisy}$ 1404 is expected to be fairly close, relative to the signal size, to the vector $m_{noisy}$ containing counts of symbols observed in a noisy signal. Provided that the channel-noise-model matrix Π is invertible, or an approximate or pseudo inverse of the matrix Π can be obtained by any of a number of matrix inversion methods, an observed vector $m_{noisy}$ including the counts of occurrences of symbols observed in a noisy signal can be multiplied by the inverse of the channel-noise-model matrix Π to produce approximate estimates of the counts of occurrences of symbols in the clean signal:

$$m_{clean} \cong m_{noisy}\Pi^{-1}$$

This approximation technique can be extended to vectors $\tilde{q}_{C_j}^T$ that include the derived probabilities of occurrences of symbols of the alphabet A observed in contexts $C_j$ in the noisy signal to produce estimates of probabilities of occurrence of symbols in the alphabet A in the clean signal corresponding to occurrences of the context $C_j$ in the noisy signal by multiplication of $\tilde{q}_{C_j}^T$ by the inverse of the channel-noise-model matrix Π, as follows:

$$\bar{q}_{clean,C_j}^T \cong \tilde{q}_{C_j}^T \Pi^{-1}$$

Figure 15:
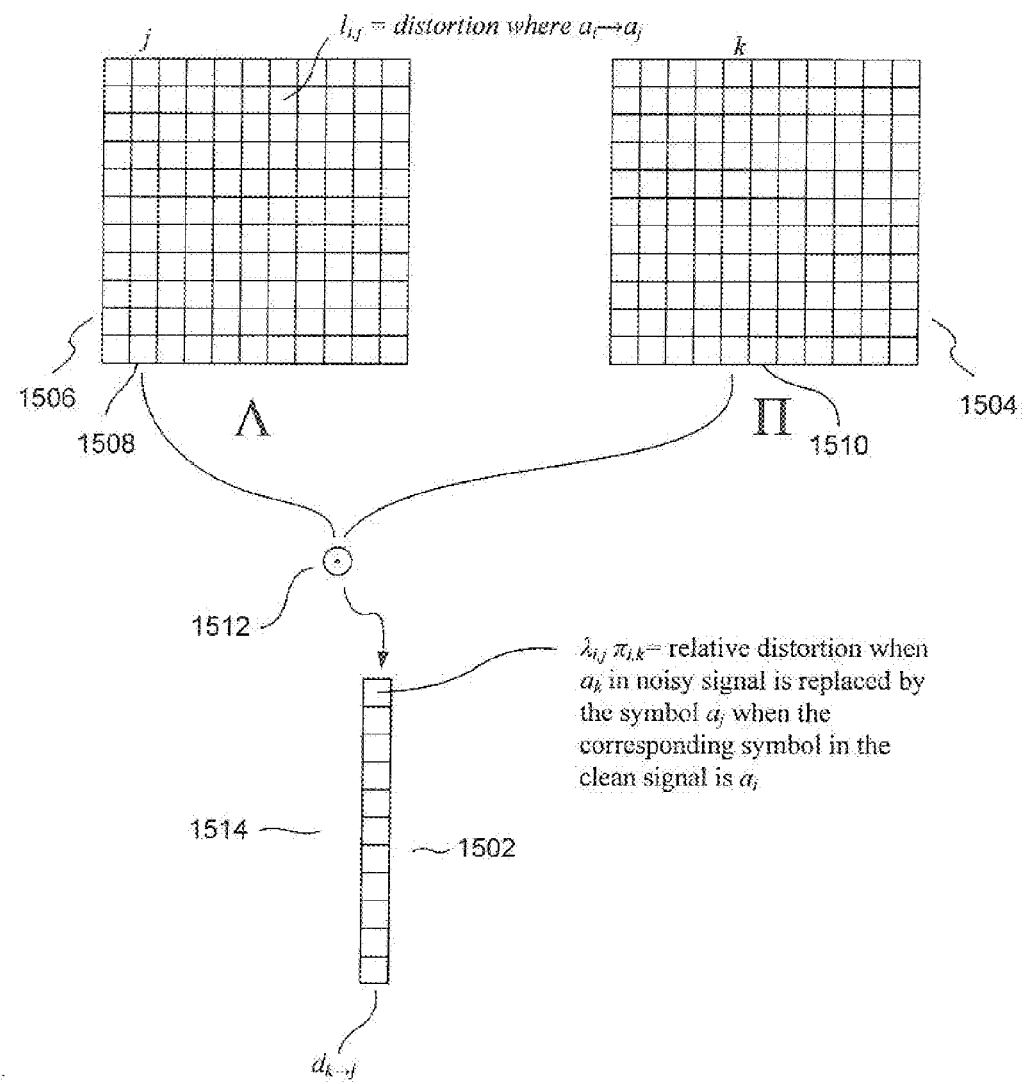
FIG. 15 illustrates construction of a relative distortion vector for replacement of a symbol $a_k$ in a noisy signal by a symbol $a_j$.

FIG. 15 illustrates construction of a relative distortion vector that numerically expresses the distortion expected from replacement of a symbol $a_k$ in a noisy signal by a symbol $a_j$. Construction of a relative distortion vector 1502 involves a column of the channel-noise-model matrix Π 1504, discussed above with reference to FIG. 14, as well as a column from the distortion matrix Λ 1506. Each element $\lambda_{i,j}$ in the distortion matrix Λ contains a numerical estimate of the distortion produced in an image when the symbol $a_i$ in the clean signal is replaced by the symbol $a_j$ in the noisy signal. When a column j 1508 is selected from the distortion matrix Λ and a column k is selected from the channel-noise-model matrix Π 1510, and the selected columns $\lambda_j$ and $\pi_k$ are combined by the Schur product operation 1512, the distortion vector $d_{k \to j}$ 1514 is produced. The Schur product is carried out by the multiplication of each element in the column $\lambda_j$ by the corresponding element in the $\pi_k$ column. Each element of the distortion vector $d_{k \to j}$, $\lambda_{i,j}$, $\pi_{i,k}$, includes a numerical estimate of the relative distortion produced when symbol $a_k$ in a noisy signal is replaced by the symbol $a_j$ when the corresponding symbol in the clean signal is $a_i$.

FIG. 16 illustrates the computation of an estimate of the distortion produced by replacing symbol $a_k$ within context C in a noisy signal by the replacement symbol $a_j$. This distortion value is obtained by the inner product of the row vector $\bar{q}_{clean,C}^T$ 1602 by the distortion column vector $d_{k \to j}$ 1604. Note that the row vector $\bar{q}_{clean,C}^T$ is obtained, as discussed above, by multiplying the derived row vector $\bar{q}^T{}_C$ by the inverse of the channel-noise-model matrix $\Pi$. Therefore, as shown in FIG. 16, a numerical estimate of the distortion produced by replacing the symbol $a_k$ within context C in a noisy signal by the symbol $a_j$ can be obtained entirely from the derived symbol occurrence frequencies within the noisy signal, the distortion matrix $\Lambda$, and the channel-noise-model matrix $\Pi$ and its inverse $\Pi^{-1}$.

FIG. 17 illustrates a symbol-replacement function $g(C,z)$. The symbol-replacement function $g(C,z)$ computes a replacement symbol for an observed central symbol z within an observed context C. The observed central symbol and context are supplied as arguments to the symbol-replacement function $g(C,z)$. The function $g()$ considers each possible replacement symbol value for the central symbol of the context C and returns the estimated minimally distorting replacement character $\hat{x}$, where, for a given observed central symbol z within an observed context C:

$$\hat{x} = g(C, z) = \frac{\operatorname{argmin}}{a_j : j = 1 \text{ to } n} (\hat{d}_{z \to a_j})$$

where, for $z = a_i$, $\hat{d}_{z \to a_j} = \hat{d}_{a_i \to a_j} = \tilde{q}_{clean,C}^T \cdot d_{i \to j}$ Thus, the symbol-replacement function $g()$ produces a replacement character $\hat{x}$ for an observed central symbol z within a context C observed in the noisy signal.

Alternative denoising methods may employ two or more levels of clustering. In the following discussion, a two-level-clustering approach is described, in which context-clustering classes include prediction classes and conditioning classes.

Figure 18:
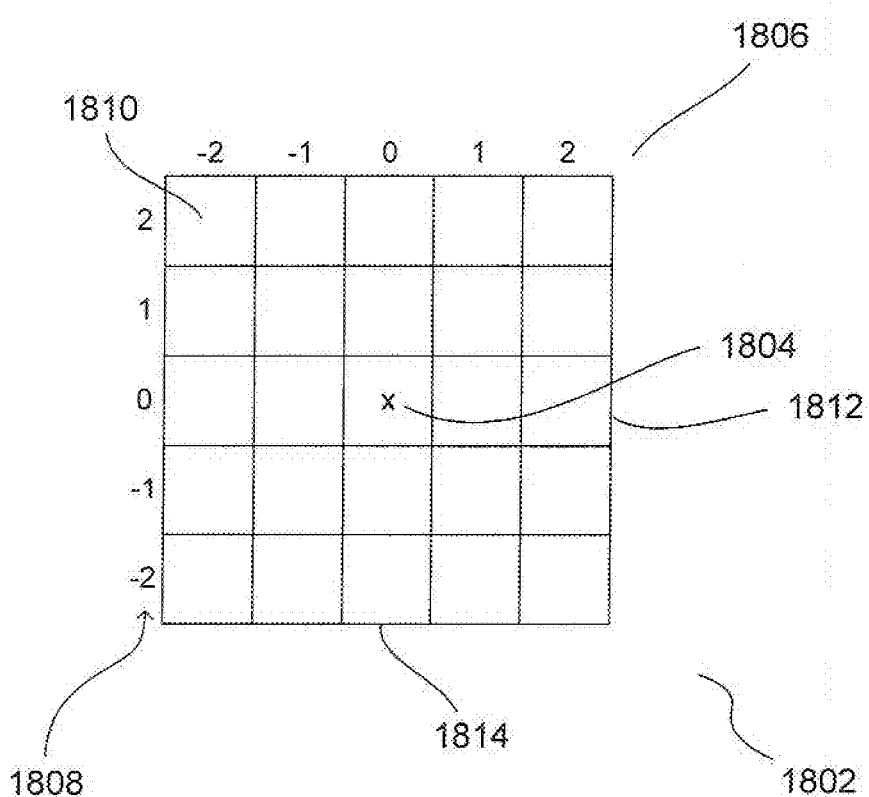
FIG. 18 illustrates a 5×5 context that is used as a basis for predicting a value corresponding to a context-embedded symbol in the described family of embodiments of the present invention.

FIG. 18 illustrates a 5×5 context that is used as a basis for predicting a value corresponding to a context-embedded symbol in the described family of embodiments of the present invention. As with the various alternative contexts, described in the preceding subsection, the 5×5 context 1802 shown in FIG. 18 is an abstract template that is superimposed over a central symbol "x" 1804 of an image in order to define the local context within which the symbol "x" is embedded. The 5×5 context defines a symmetrical, square region of 24 symbols that surround the central symbol 1804. The central symbol "x" 1804 is not considered to be part of the context in which it is embedded. In FIG. 18, numeric indexing used to index each symbol within the context is shown above 1806 and to the left-hand side 1808 of the context 1804. Each symbol in the context is indexed in similar fashion to a point in two-dimensional Cartesian space defined by x and y axes. The symbol 1810, for example, has indices (−2,2), the first index of the pair relative to a horizontal axis 1812 comprising the central row of symbols within the context and the second index of the pair relative to a vertical axis 1814 comprising the central column of symbols within the context. In the following discussion, a context may be considered to be a two-dimensional matrix, with two indices used to indicate a particular element of the context, or, equivalently, a one dimensional vector with a single index, with the one-dimensional vector constructed by, as one example, concatenating rows or columns of the two-dimensional matrix in a particular order. The two indices for the matrix representation or single index for a vector representation are provided within parentheses, and shown as a subscript to a context symbol, such as "$C_{(-1, 1)}$." The context symbol can also be used to describe a context-generating function that generates a context for a particular symbol within a dataset:

$$C_i^j = C^j(j_i)$$

where $C_i^j$ is the context selected to embed symbol $j_i$ from image or dataset j; and $C^j(\ )$ is a function that generates context $C_i^j$ for dataset j symbol $j_i$.

Figure 19:
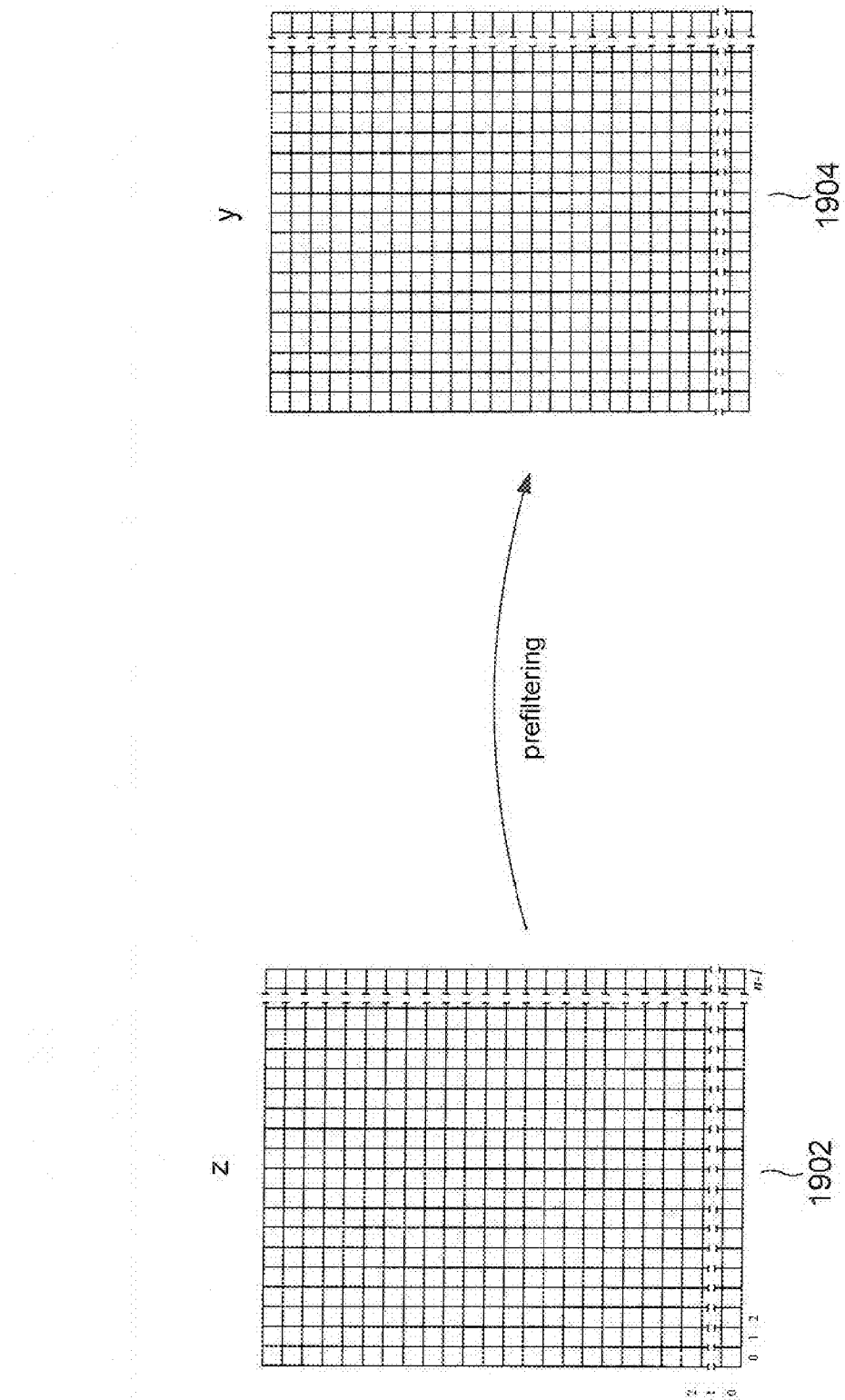
FIG. 19 illustrates an initial step in a discrete-universal denoising method in which embodiments of the present invention are applied.

FIG. 19 illustrates an initial step in a discrete-universal denoising method that represents an embodiment of the present invention. In the current discussion, the noisy data set on which methods of the present invention operate is considered to be a two-dimensional image, denoted as z, with elements $z_i$. However, any of various different types of one-dimensional and higher-dimensional datasets may be denoised by iterative denoisers that include embodiments of the present invention. In FIG. 19, the noisy image z 1902 is shown on the left side of the figure. The two-dimensional noisy image can be considered to be a two-dimensional matrix, with elements $z(i,j)$ where i is a row index and j is column index. However, a two-dimensional image can be alternatively considered to be a one-dimensional vector z with elements $z_i$. For example, rows of the two-dimensional image may be concatenated together, in row order, to produce the vector z. When convenient, noisy image z may be treated as a two-dimensional matrix, or, at other times, treated as a one-dimensional vector, with the notation z and $z_i$ used for both. The same convention is used for describing filtered, denoised, and clean images and contexts within images.

In an initial step in certain denoising methods, a noisy image z is filtered to produce a prefiltered, noisy image y 1904. Both z and y generally have the same number of elements. The prefiltering step can be carried out in a variety of different ways. In one approach, a neighborhood, or context, about each pixel is considered, and a prefiltered-image symbol $y_i$ is predicted, or generated, from the image-element values, or pixel values, in a context or neighborhood surrounding each noisy-image pixel $z_i$ using one of various different filtering methods. The filtering methods can be described as computing the prefiltered-image symbol $y_i$ corresponding to noisy-image symbol $z_i$ as a function of the neighborhood $\eta_i$ about noisy-image symbol $z_i$:

$$y_i = f(\eta_i, z_i)$$

where $\eta_i$ is the neighborhood of element $z_i$ in noisy image z.

Prefiltering generally removes or ameliorates certain types of noise corruption in a noisy image. One example of a prefiltering function is a function that averages all of the values of image elements in the neighborhood of noisy-image element $z_i$ to compute corresponding prefiltered-image symbol $y_i$. An averaging type of prefiltering may be effective for certain types of images, but may be deleterious for others, including images that contain sharp detail and high-contrast features, such as edges. In certain cases, an appropriate prefiltering function may be selected, by method embodiments of the present invention, based on criteria that depend on the type of noisy image z that is sought to be denoised. The prefiltered image y is primarily used for generating context classes, symbol prediction, and bias estimation for prediction classes.

Figure 20:
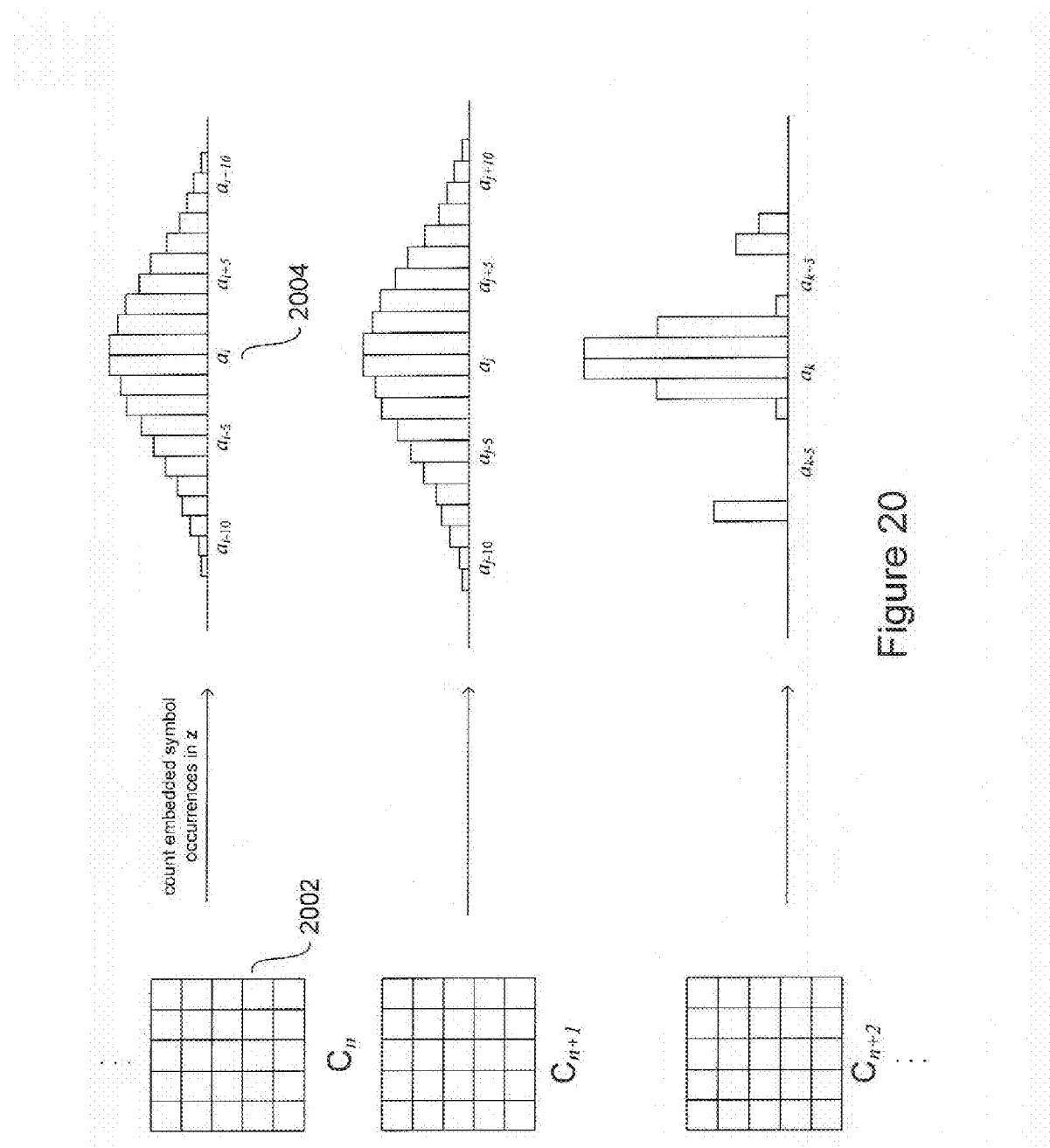
FIGS. 20-22 illustrate the concept of prediction classes and conditioning classes.
Figure 21:
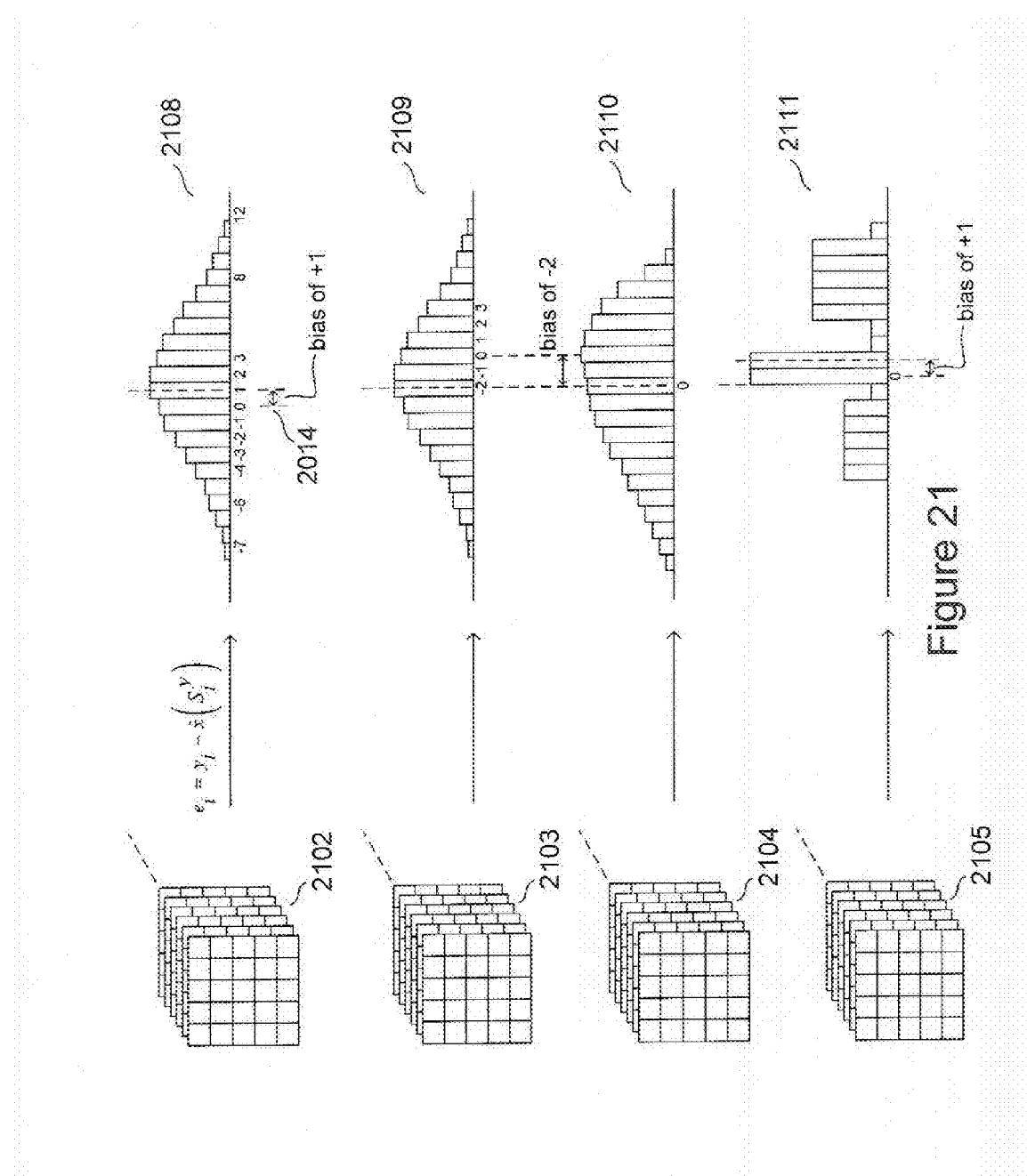
Figure 22:
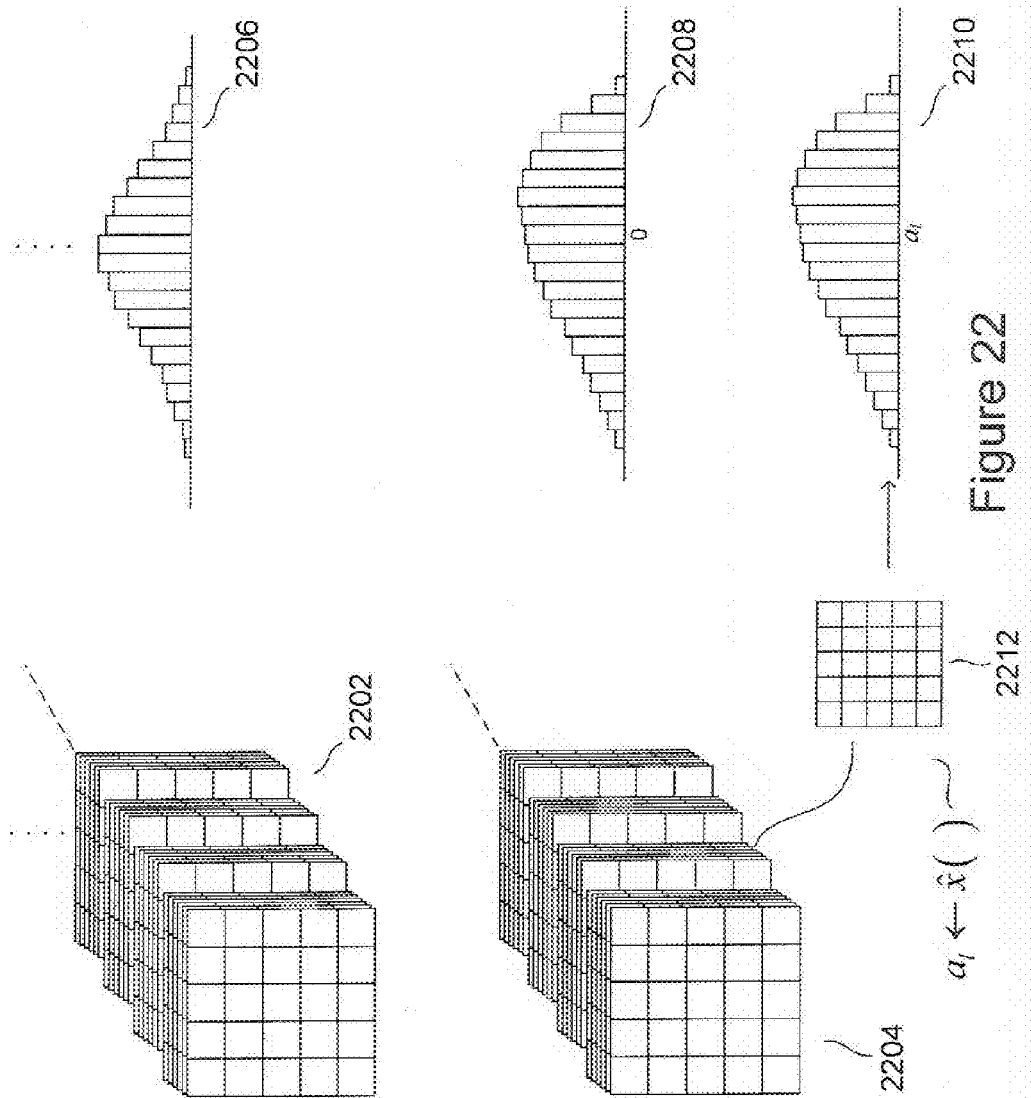

FIGS. 20-22 illustrate the concept of prediction classes and conditioning classes. As shown in FIG. 20, each different context that occurs in an image, such as context 2002, would be expected to generate a corresponding symbol-occurrence distribution, such as symbol-occurrence distribution 2004, were the context to occur a sufficient number of times in the image. However, as one example, for a grayscale image, in which each pixel value is selected from the range $\{0, 1, \ldots, 255\}$, the number of possible 5×5 contexts, each of which includes the 24 symbols other than the central symbol, is $256^{24}$. Were these different possible contexts to be of equal probability of occurrence within an image, the probability that any given context would occur even a single time within the image would be vanishingly small. Even for decidedly non-uniform context-occurrence probability distributions, there are nonetheless generally far too few occurrences of most contexts to generate statistically meaningful symbol-occurrence distributions, such as those shown in FIG. 20, for individual contexts.

In order to achieve meaningful levels of observables, contexts are grouped into various types of context classes. FIG. 21 illustrates prediction classes into which individual contexts are grouped. In FIG. 21, four prediction classes 2102-2105 are shown associated with four corresponding prediction-error distribution 2108-2111. All of the contexts within a prediction class are assumed to exhibit similar prediction-error distributions. Various different techniques may be used to group contexts together into prediction classes. In general, the context groupings are estimates derived from numerical procedures based on assumptions of the distribution of pixel values in images. For example, for particular types of images, assumption of continuity of pixel-value trends along arbitrary directions within the image may be assumed. Additional assumptions may include symmetry-based assumptions and/or pixel-value-scaling based assumptions. A first prediction traversal of the image is used to accumulate distributions of prediction errors for each prediction class. A symbol $\tilde{x}_i$ is predicted for each prefiltered-image symbol $y_i$ using a prediction function $\tilde{x}(S_i^{y_i})$, where $S_i^{y_i}$ is the prefiltered-image context in which prefiltered-image symbol $y_i$ is embedded. A prediction error, $y_i - \tilde{x}(S_i^{y_i})$, is then computed for each predicted symbol $\tilde{x}_i$. The errors are accumulated, in a histogram, for each prediction class. By computing predictions errors from prefiltered-image symbols, rather than from noisy-image symbols $z_i$, as in the above-described DUDE and DUDE-CTI methods, a significant amount of noise distortion in contexts and in prediction-error statistics is avoided. Accumulation of prediction errors for all of the contexts in a prediction class is possible because, although each context in a prediction class may predict a different symbol, the predicted error $y_i - \tilde{x}(S_i^{y_i})$ depends only on the 0-centered prediction-error distribution common to all contexts within the prediction class. However, despite an assumption that the prediction-error distributions are centered about 0, it is often observed, as shown in FIG. 21, that the observed prediction-error distributions are slightly shifted, or biased, with a non-zero mean prediction error. For example, the prediction-error distribution 2108 exhibits a bias 2014 of 1, since the mean prediction error is 1.

The estimated biases obtained from the prediction-error distributions accumulated for each prediction class, in the first traversal of the image, are used to correct the symbols predicted from each prediction class so that the prediction-error distribution for each prediction class has a mean value of 0. Once corrected, following the first traversal of the image, the prediction classes are grouped together into larger conditioning classes for conditioning-class statistics collection in a second traversal of the image. FIG. 22 illustrates conditioning classes. In FIG. 22, two conditioning classes 2202 and 2204 are shown with associated prediction-error distributions 2206 and 2208. In general, a sufficient number of contexts are grouped within each conditioning class to obtain a common, statistically meaningful prediction-error distribution for each conditioning class. As shown in FIG. 22, the symbol-occurrence probability distribution 2210 for a particular context C 2212 of a conditioning class can be obtained by centering the conditioning-class prediction-error distribution about the symbol predicted from the context C by the prediction function $\tilde{x}(C)$ and normalizing the distribution.

Figure 23A:
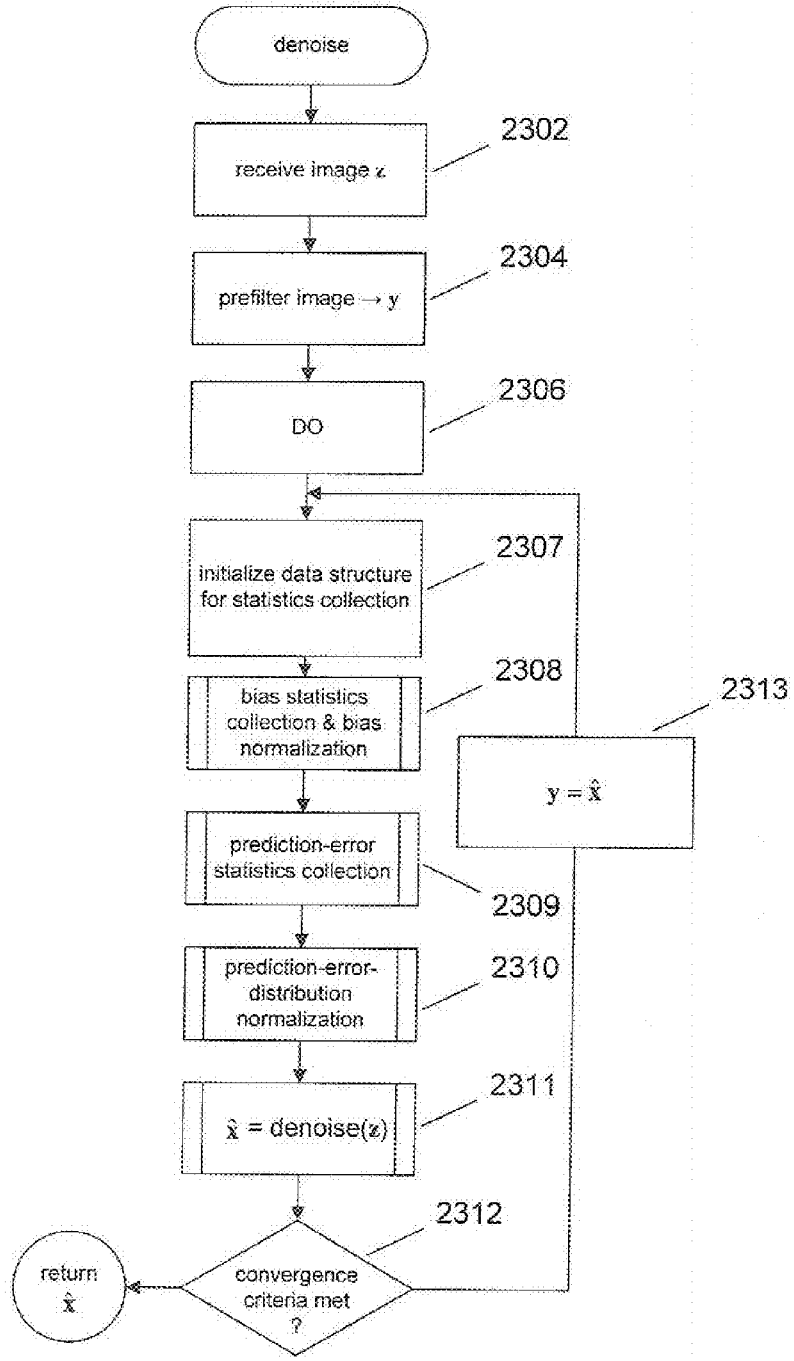
FIGS. 23A-B provide control-flow diagrams for an iterative enhanced discrete-universal denoiser.
Figure 23B:
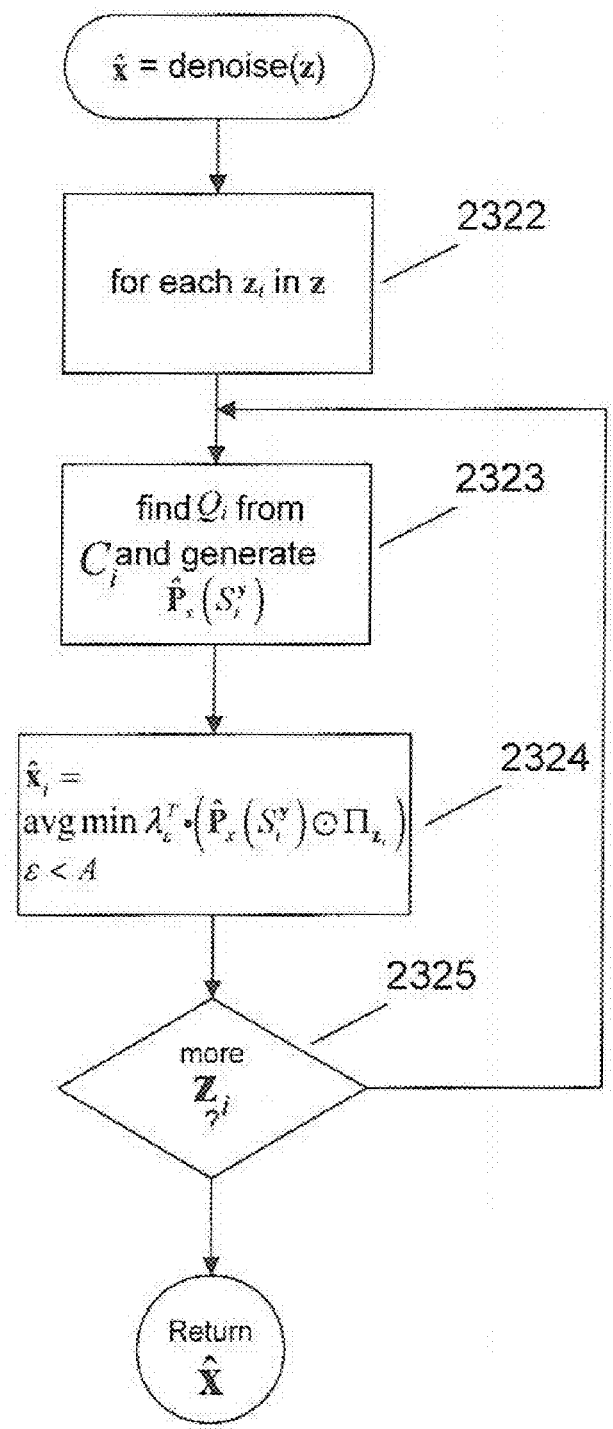

FIGS. 23A-B provide control-flow diagrams for an iterative enhanced discrete-universal denoiser. In FIG. 23A, the routine "denoise" is illustrated, in a control-flow diagram. In step 2302, a noisy image z is received. In step 2304, the noisy image z is prefiltered, as discussed above with reference to FIG. 19, to produce a first prefiltered image $y^1$. Then, in the do-while loop of steps 2306-2313, the noisy image is iteratively denoised until one or more convergence criteria for the denoising method are met, as determined in step 2312. In the current iteration, data structures for statistics collection are initialized in step 2307. Then, bias statistics are collected and bias-based corrections are carried out in step 2308, as discussed above with reference to FIG. 21. The biases computed in step 2308 allow for accurate combination of prediction classes to generate larger conditioning classes for which prediction-error statistics are collected in a second statistics-collection phase, in step 2309, as discussed above with reference to FIG. 22. In steps 2309 and 2310, prediction-error statistics are collected and analyzed for each conditioning class in order to generate symbol-prediction-error distributions for each conditioning class. Once these statistics have been collected and normalized, and prediction-error distributions have been generated for each conditioning class, then, in step 2311, a denoised image $\hat{x}$ is generated from the noisy image z. When the one or more global convergence criteria have been satisfied, as determined in step 2312, then the current, denoised image $\hat{x}$ is returned as the denoised image. Otherwise, the current denoised image $\hat{x}$ becomes the prefiltered image, y, for a next iteration of the do-while loop, in step 2313.

FIG. 23B provides a flow-control diagram for step 2311 in FIG. 23A. Denoising of the noisy image z to produce the denoised image $\hat{x}$ is carried out in the for-loop of steps 2322-2325. In this for-loop, each symbol $z_i$ in noisy image z is considered. In step 2323, the conditioning class $Q_i$ is determined from the context $C_i^y$ in prefiltered image y for currently considered noisy-image symbol $z_i$, where the context $C_i^y$ is the context in the prefiltered image y aligned with element $z_i$ in a noisy image z. An estimated context-specific clean symbol distribution $\hat{P}_x(S_i^y)$ is generated by a transformation of the context-class prediction-error distribution $\hat{P}_E(Q_i)$. In one embodiment of the present invention, the transformation is carried out by multiplication of $\hat{P}_E(Q_i)$ by a matrix:

$$\hat{P}_x(S_i^y) = C(\hat{x}_i)\hat{P}_E(Q_i^y)$$

$\hat{P}_x(S_i^y)$ is used, in step 2324, along with columns of the channel-noise-model matrix $\Pi$ and the distortion matrix $\Lambda$ to generate the denoised-image symbol $\hat{x}_i$ corresponding to currently considered noisy-image element $z_i$. The for-loop of steps 2322-2325 continues until all $z_i$ in noisy image z are considered, and corresponding denoised-image symbols $\hat{x}_i$ generated.

Embodiments of The Present Invention

Figure 24:
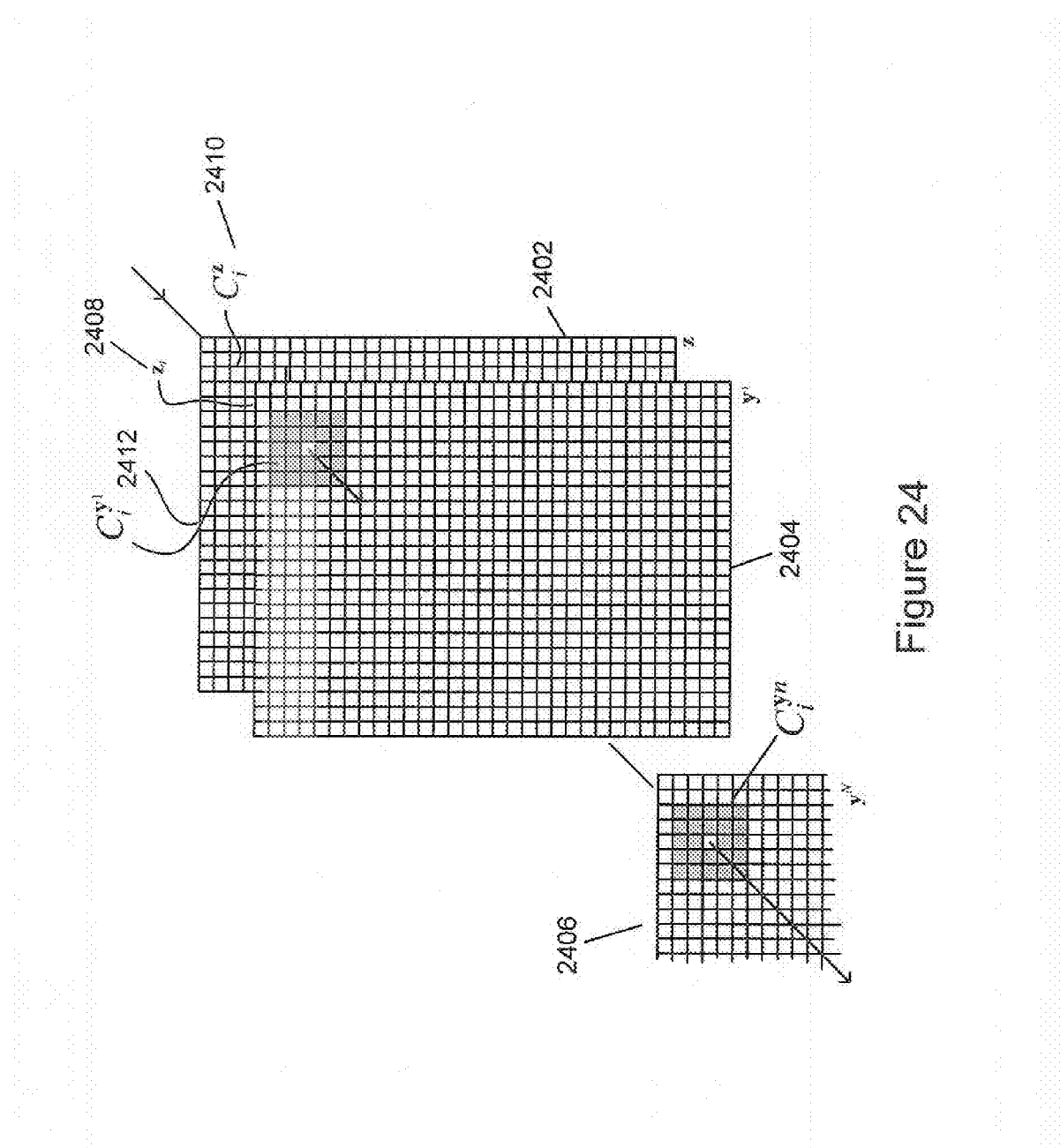
FIG. 24 illustrates the iterative discrete-universal-denoising process discussed with reference to FIGS. 22-23.

FIG. 24 illustrates the iterative discrete-universal-denoising process discussed with reference to FIGS. 22-23. FIG. 24 shows a portion of the noisy image z 2402, a corresponding portion of the first prefiltered image $y^1$ 2404, and a portion of a corresponding portion of a subsequent prefiltered image $Y'''$ 2406. A symbol $z_i$ 2408 is shown as embedded within a noisy-image context $C_i^z$ 2410 in the noisy image z 2402. The context $C_i^{y^1}$ 2412 is the first prefiltered-image context aligned with, and corresponding to, context $C_i^z$ 2410 in the noisy image 2402. In the first iteration of the iterative, denoising process illustrated in FIGS. 22-23, the symbol $\hat{x}_i$ corresponding to noisy-image symbol $z_i$ is generated based on the conditioning class corresponding to prefiltered-image context $C_i^{y^1}$, on the noisy-symbol value $z_i$, and, indirectly, on the pre-filtered image symbol $y_i^1$, as discussed in greater detail below. In other words, contexts are derived from the current prefiltered image $y^1$ in the current iteration of the iterative process, but symbol denoising involves a computation based both on this current prefiltered-image context as well as the underlying noisy-image symbol embedded within the context. In each subsequent iteration of the iterative denoising process, as shown in FIG. 22, the current filtered image is updated, so that, over a course of N+1 iterations, as indicated in FIG. 24, N different prefiltered images are generated from which contexts are derived for symbol prediction and collection of symbol-occurrence statistics. In other words, the contexts and context clusters evolve, during the iteration process, since they are selected from each of successive filtered images.

As discussed above with reference to FIG. 19, the first prefiltered image $y^1$ is generated using a median filter or other such filter based on noisy-image contexts. However, subsequent prefiltered images $y^2, y^3, \ldots, y^N$ are based on the output image of the preceding iteration as well as on the underlying noisy-image symbols. The denoised image $\hat{x}$ produced by iteration k during the iterative discrete-universal-denoising process becomes the prefiltered image $y^{k+1}$ for iteration k+1. Therefore, although the noisy-image contexts $C_i^z$ are independent of the noisy symbols embedded within them, the symbol values of the successive prefiltered images become functionally dependent on an increasing number of embedded noisy-symbol values.

Figure 25A:
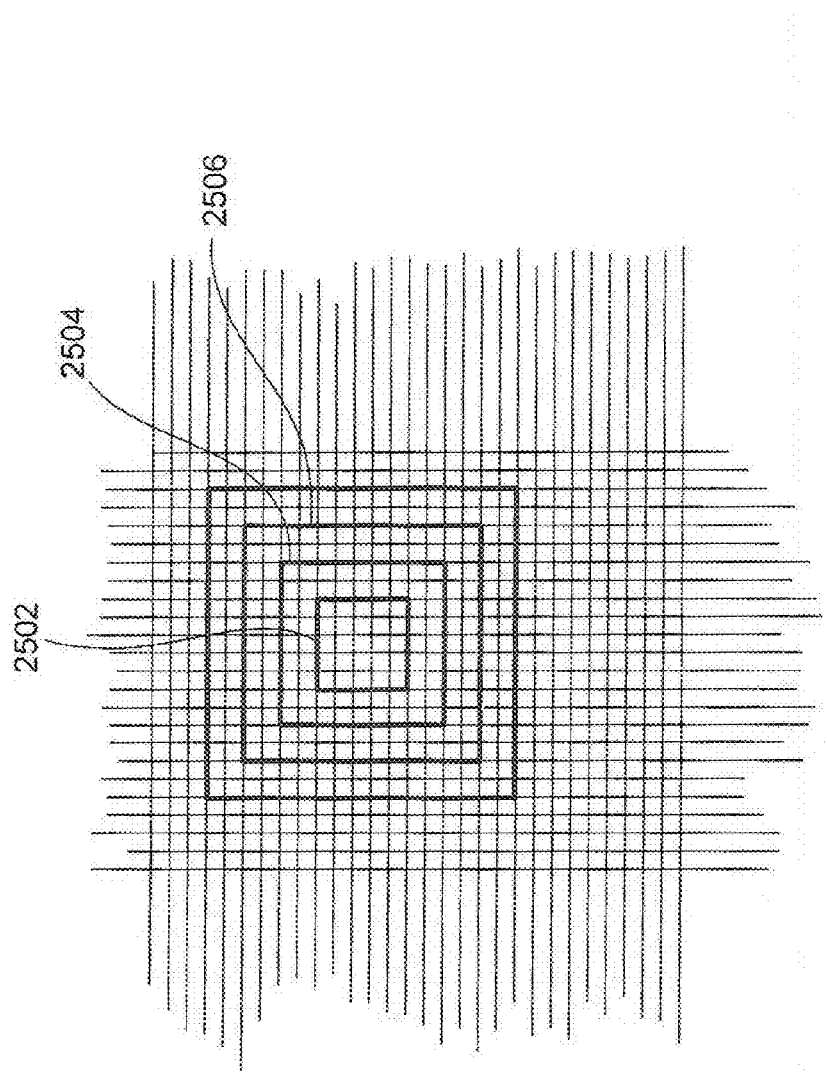
FIG. 25A illustrates the portions of a noisy image that may contribute to the symbol values within a context in successive versions of an image produced by the iterative enhanced discrete-universal denoiser described with reference to FIGS. 23A-B.

FIG. 25A illustrates the portions of a noisy image that may contribute to the symbol values within a context in successive versions of an image produced by the iterative enhanced discrete-universal denoiser described with reference to FIGS. 23A-B. Initially, the context 2502 in a noisy image contains noisy-image symbol values, in which any noise corruption is independent from one noisy-image symbol to another, under one of the assumptions of the discrete universal-denoising method. The symbol values of the corresponding prefiltered-image-$y^1$ context depend on noisy-symbol values in the region 2504. A larger area of the noisy image contributes to the symbol values in the context of the prefiltered-image-$y^1$ corresponding to context 2502 of the noisy image because calculation of each prefiltered-image symbol value is based on the noisy-image context surrounding that symbol in the noisy image, and, since 5×5 contexts are used, in the current example, an additional two rows and two columns at the boundary of the original context contribute to the symbol values within the context of the prefiltered-image-$y^1$ corresponding to context 2502 of the noisy image. The region of the noisy image containing symbols that may affect the symbol values in the filtered-image-$y^2$ context corresponding to noisy-image context 2502 increases further to area 2506. Thus, the number of noisy-image symbols that may contribute to the symbol values within successive prefiltered images increases with each successive prefiltered image. In many respects, this phenomenon is desirable, providing benefits of larger contexts without incurring a dilution in symbol-occurrence statistics that would result from using larger contexts.

Figure 25B:
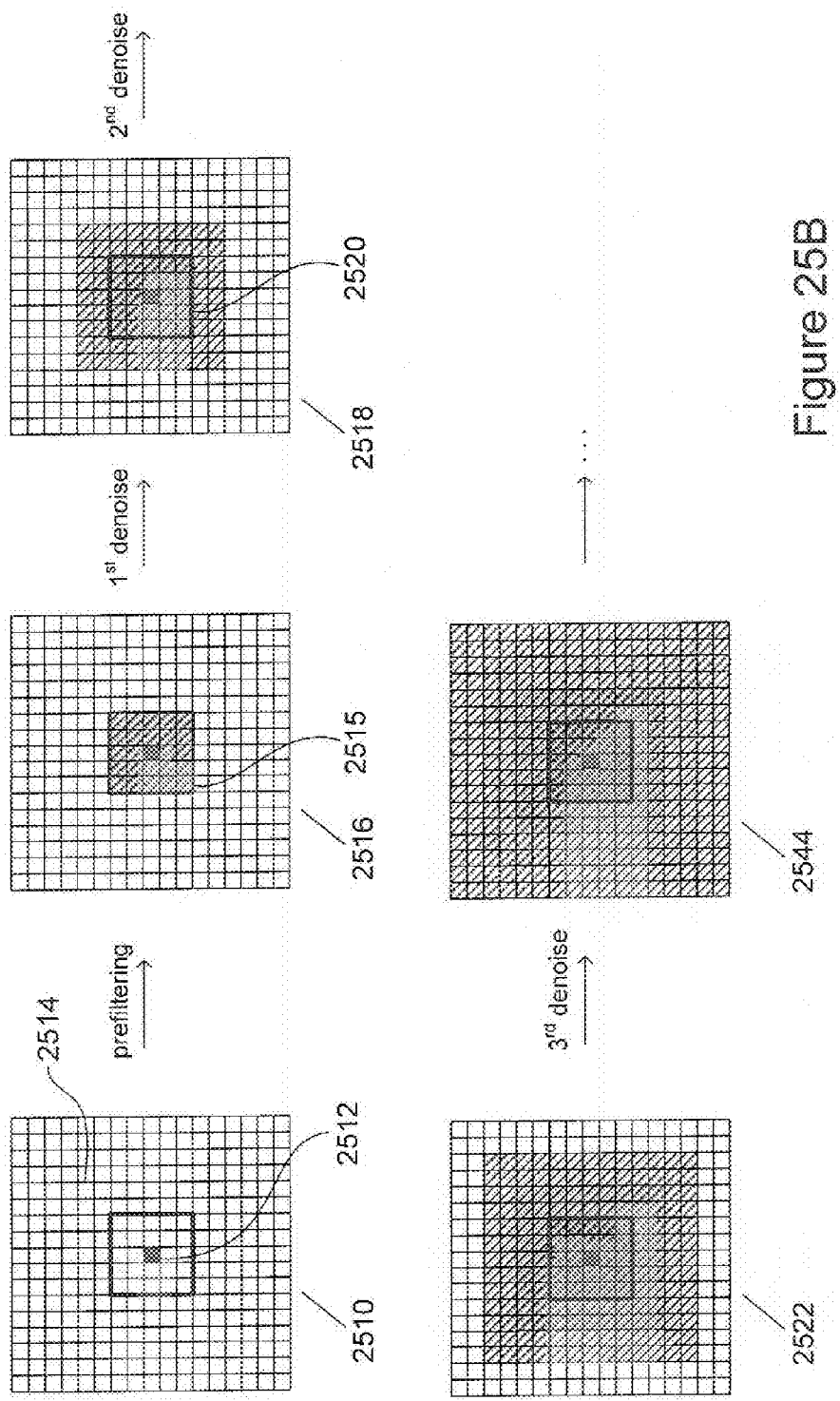
FIG. 25B illustrates the portions of successive versions of an image produced by the iterative enhanced discrete-universal denoiser described with reference to FIGS. 23A-B that contain symbols with values partially dependent on the symbol value of a particular noisy symbol in a noisy image.

FIG. 25B illustrates the portions of successive versions of an image produced by the iterative enhanced discrete-universal denoiser described with reference to FIGS. 23A-B that contain symbols with values partially dependent on the symbol value of a particular noisy symbol in a noisy image. Initially, in a noisy image 2510, the noise component of a noisy symbol value 2512 within a context 2514 does not contribute to any other symbol value in the image, according to the assumptions of the discrete universal-denoising method. However, after a prefiltering step, the noise component of the noisy symbol value may have contributed to the prefiltered-image values of the other symbols in the corresponding context 2515 of prefiltered image $y^1$ 2516, as indicated in FIG. 25B by shading of these symbols. The contribution of the noise component of the noisy-symbol value due to prefiltering expands still further, beyond the boundaries of the context, after a first denoising iteration, which produces a denoised image that is subsequently used as prefiltered image $y^2$ 2518 for the second denoising iteration. Furthermore, denoising itself may cause further contribution of the noise component of the noisy-symbol value to symbols within the prefiltered-image-$y^2$ context 2520, as indicated by darker shading of those symbols in FIG. 25B. Additional expansion of these effects, and introduction of additional dependencies, may occur with each denoising iteration, as indicated by shading for prefiltered images $y^2$ 2522 and $y^3$ 2544. In general, the dependencies between symbol values within the successive prefiltered images quickly grow quite complex. Bleeding of the noise contribution of the value of a particular symbol into the values of surrounding symbols violates the assumption of independence of the noise-contributions to symbol values underlying the theory of discrete universal-denoising method, and is thus an undesirable characteristic of the iterative denoising method.

The two phenomena, illustrated in FIGS. 25A-B may interact in very complex and unstable ways, leading to increasingly significant violations of the assumption of independence of the noise-contributions to symbol values underlying the theory of discrete universal-denoising method. The denoising method may still work, despite violation of these assumptions, for several iterations, but may then fail spectacularly in subsequent denoising iterations, as discussed further below. In general, in the initial prefiltered image $y^1$ and some number of successive prefiltered images, the functional dependencies of the prefiltered-image context symbol values on the underlying noisy-symbol embedded in the context are not sufficiently significant to degrade image denoising, as measured by signal-to-noise ratios or by some other metric. However, after some number iterations, the dependencies of prefiltered-image-context values on the underlying, embedded noisy-image symbol $z_i$ may become sufficiently significant to degrade denoising, so that the signal-to-noise ratio may fall precipitously from one iteration to the next.

The symbol-correction decision in DUDE, and related denoisers, can be interpreted as combining two pieces of advice on the value of the clean symbol, which is unknown, based on the noisy image and on the noise model. On one hand, the context statistics convey information on what the clean symbol is likely to be, given what is observed in similar contexts throughout the rest of the noisy image, while, on the other hand, the noisy sample itself conveys information on the likelihood of the corresponding clean sample value. In other words, the noise-related portion of a noisy-sample value does not depend on clean-image values. If the noise level is not too high, the advice of the noisy sample is given more weight, while, under more noisy conditions, the advice of the context is given increasing weight. The decision formula combines these pieces of advice under the assumption that the noisy sample value in the current location is not part of the context in which the noisy sample is embedded. However, prefiltering introduces some dependence of contexts on their noisy center samples, since the value of the center sample might have participated in the denoising of some of the components of the context in previous iterations, as discussed below with respect to FIGS. 25A-B. This is undesirable, since the information on the noisy center sample should be incorporated separately in the decision formula. These dependencies are the source of the observed degradation as the dependence becomes stronger from one iteration to the next.

Embodiments of the present invention address the problem discussed above with reference to FIGS. 24-25 by determining, on a context-class-by-context-class basis, when the functional dependencies of filtered-image contexts on underlying noisy-image noisy symbols become sufficiently significant to deleteriously affect context-based denoising. Embodiments of the present invention can interrupt or terminate context-based denoising for those conditioning classes for which the DUDE statistical assumptions are violated to the extent that denoising based on statistics collected for those conditioning classes is degraded, and yet continue to iterate towards convergence using context-based denoising with respect to those conditioning classes for which statistical assumptions remain valid for denoising.

As discussed below, embodiments of the method of the present invention employ symbol-prediction statistics and the channel noise model, as represented by the matrix Π, to determine when a conditioning class should not be used for denoising. The determination depends on noise model assumptions. In the following discussion, methods for making this determination in the cases of M-ary symmetric channel noise and salt-and-pepper noise are provided as examples of the noise-model-dependent determination technique. In general, when more or less than a number of noise-corrupted symbols estimated from channel statistics is observed for contexts of a conditioning class, then the conditioning class is deemed invalid. For example, when a salt-and-pepper noise model is assumed, and when more than an expected number of white noise symbols $a_{255}$ occur in dark backgrounds and/or black noise symbols $a_0$ occur in light backgrounds within contexts of a conditioning class, then the conditioning class is deemed invalid, and not used for denoising. The expected number of noisy symbols for contexts of a conditioning class is derived from channel parameters.

Figure 26:
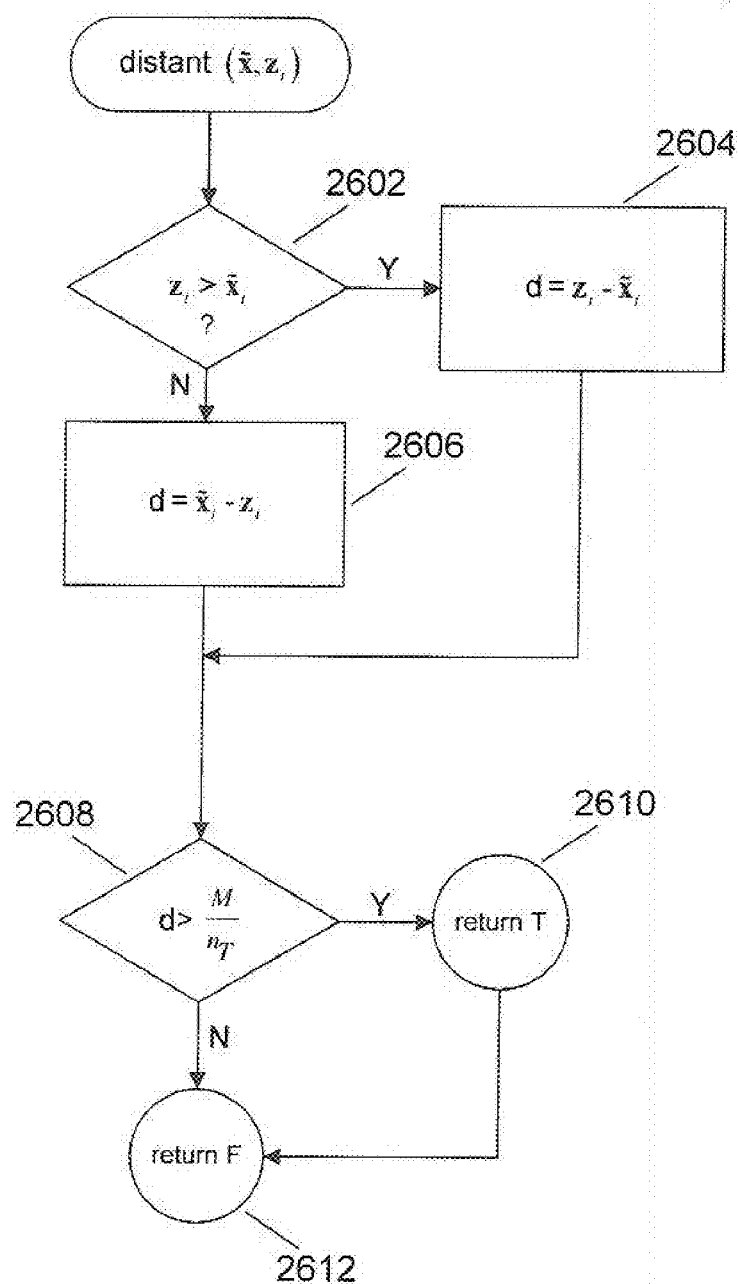
FIG. 26 provides a control-flow diagram for a function "distant," employed in embodiments of the present invention, that determines whether or not a symbol predicted by a context-based predictor, $\bar{x}( )$, is sufficiently distant, in symbol value, from the corresponding noisy-image symbol $z_i$ to suggest that the context on which the prediction is based is noise corrupted or that the underlying noisy-image symbol $z_i$ is noise corrupted.

FIG. 26 provides a control-flow diagram for a function "distant" that determines whether or not a symbol predicted by a context-based predictor, $\tilde{x}(\ )$, is sufficiently distant, in symbol value, from the corresponding noisy-image symbol $z_i$ to suggest that the symbol $z_i$ is noise corrupted. The function is used for M-ary symmetric channel noise, as discussed further below. When $z_i$ is greater than $\tilde{x}_i$ as determined in step 2602, an initial distance d is computed as $z_i-\tilde{x}_i$, in step 2604. Otherwise, the distance is computed as $d=\tilde{x}_i-z_i$ in step 2606. When the computed distance is greater than some threshold value, $$\frac{M}{n_T},$$

where $n_T<M$, as determined in step 2608, then the function "distant" returns a value TRUE in step 2610, and otherwise returns a value FALSE in step 2612. Thus, the function "distant" indicates whether or not a predicted symbol $\tilde{x}_i$ is sufficiently distant, in value, from the value of symbol $z_i$ to be classified as distant. In certain cases, a small integer value, such as 2, is suitable for $n_T$.

Figure 27:
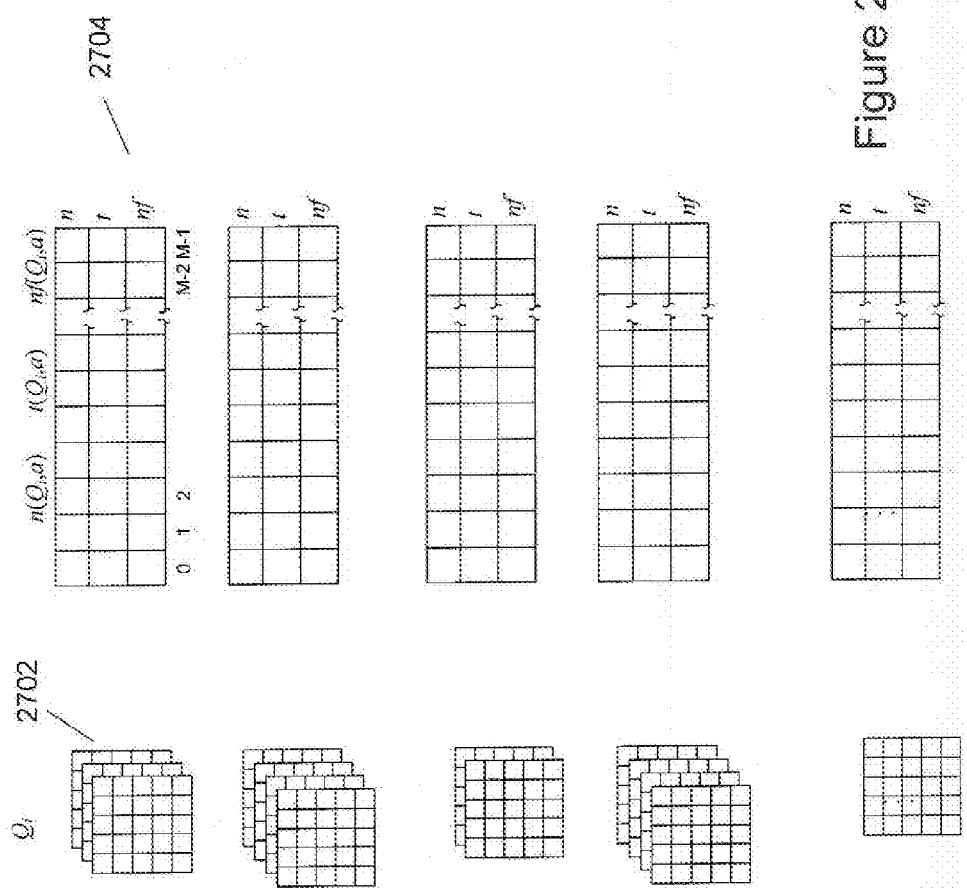
FIG. 27 illustrates data structures used to collect statistics on the frequency that the predicted symbol $\tilde{x}_i$ based on a context $C_i^{y}$ of a conditioning class is dissimilar from the context-embedded symbol $z_i$, for all noisy-image symbol values $z_i$ and all conditioning classes.

FIG. 27 illustrates data structures used to collect statistics on the frequency that the predicted symbol $\tilde{x}_i$ based on a context $C_i^y$ of a conditioning class is distant from the context-embedded symbol $z_i$, for all noisy-image symbol values $z_i$ and all conditioning classes. As shown in FIG. 27, each conditioning class, such as conditioning class 2702, is associated with a two-dimensional array, such as two-dimensional array 2704 associated with conditioning class 2702. The columns of the two-dimensional array are indexed by symbol value, with indices ranging over alphabet A, and with the three rows indexed by indices n, t, and nf. Entries in row n indicate the number of times that a predicted symbol $\tilde{x}_i$ for a context within the conditioning class $Q_i$ is sufficiently distant from the corresponding noisy-image symbol embedded in the context, as determined by the function "distant" in the case of M-ary symmetric channel noise, to indicate that the noisy-image symbol is noise corrupted. Functional notation for the value of an element of row n is "$n(Q_i,a)$," where a is a particular symbol value observed for one or more noisy-image symbols $z_i$ embedded within a context of the conditioning class $Q_i$, and $n(Q_i,a)$ is the number of times that a noisy-image symbol $z_i$ with symbol value a is determined to be noise corrupted. Similarly, entries in row t correspond to the total number of times that a particular symbol a is embedded in a context of conditioning class a during context-by-context analysis of a noisy image z, entry values in row t represented by functional notation "$t(Q_i,a)$." Finally, entries in row nf correspond to the number of times that a symbol distant from symbol value a is embedded in a context of conditioning class $Q_i$ during context-by-context analysis of a noisy image z, entry values in row nf represented by functional notation "$nf(Q_i,a)$." For the salt-and-pepper noise model, only the $a_{M-1}$ and $a_0$ columns of the table are needed.

Figure 28A:
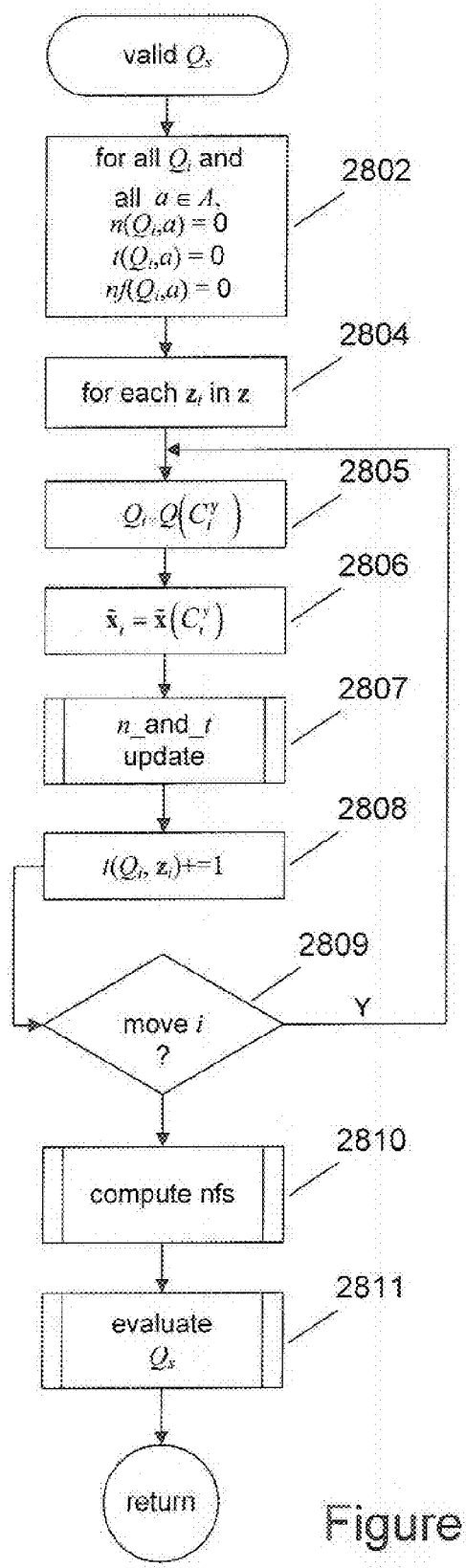
FIGS. 28A-29-C provide control-flow diagrams for a routine "validQs," which determines whether or not each conditioning class for which statistics are collected from a noisy image z remains valid with respect to discrete-universal-denoising assumptions.

FIGS. 28A-29-C provide control-flow diagrams for a routine "validQs," which determines whether or not each conditioning class for which statistics are collected from a noisy image z remains valid with respect to discrete-universal-denoising assumptions. In step 2802 of FIG. 28A, the data structures discussed above with reference to FIG. 27 are zeroed, or initialized, for all conditioning classes Q. Then, in the for-loop of steps 2804-2809, the noisy image is traversed, symbol by symbol, in order to collect statistics in the data structures discussed with reference to FIG. 27 for each conditioning class. For the currently considered noisy-image symbol $z_i$, the corresponding conditioning class is determined in step 2805. Then, in step 2806, a symbol $\tilde{x}_i$ is predicted from context $C_i^y$ for noisy-image symbol $z_i$ using a symbol-prediction function $\tilde{x}(\ )$. In step 2807, a function "n-and-t update," discussed below, is called in order to update the table entry $n(Q_i, z_i)$ when the predicted symbol $\tilde{x}_i$ is sufficiently distant from the corresponding noisy-image symbol $z_i$ to indicate that the symbol $z_i$ is noise corrupted. In step

2808, entry $t(Q_i, z_i)$ is incremented whether or not predicted symbol $\tilde{x}_i$ is distant from corresponding noisy-image symbol $z_i$. The for-loop continues while there are more noisy-image signals $z_i$ to consider, as determined in step 2809. In step 2810, the routine "compute nfs" is called to compute the entries for the nf rows of the three-row tables (2704 in FIG. 27) maintained for each conditioning class, and then, in step 2811, the function "evaluate $Q_s$" is called.

Figure 28B:
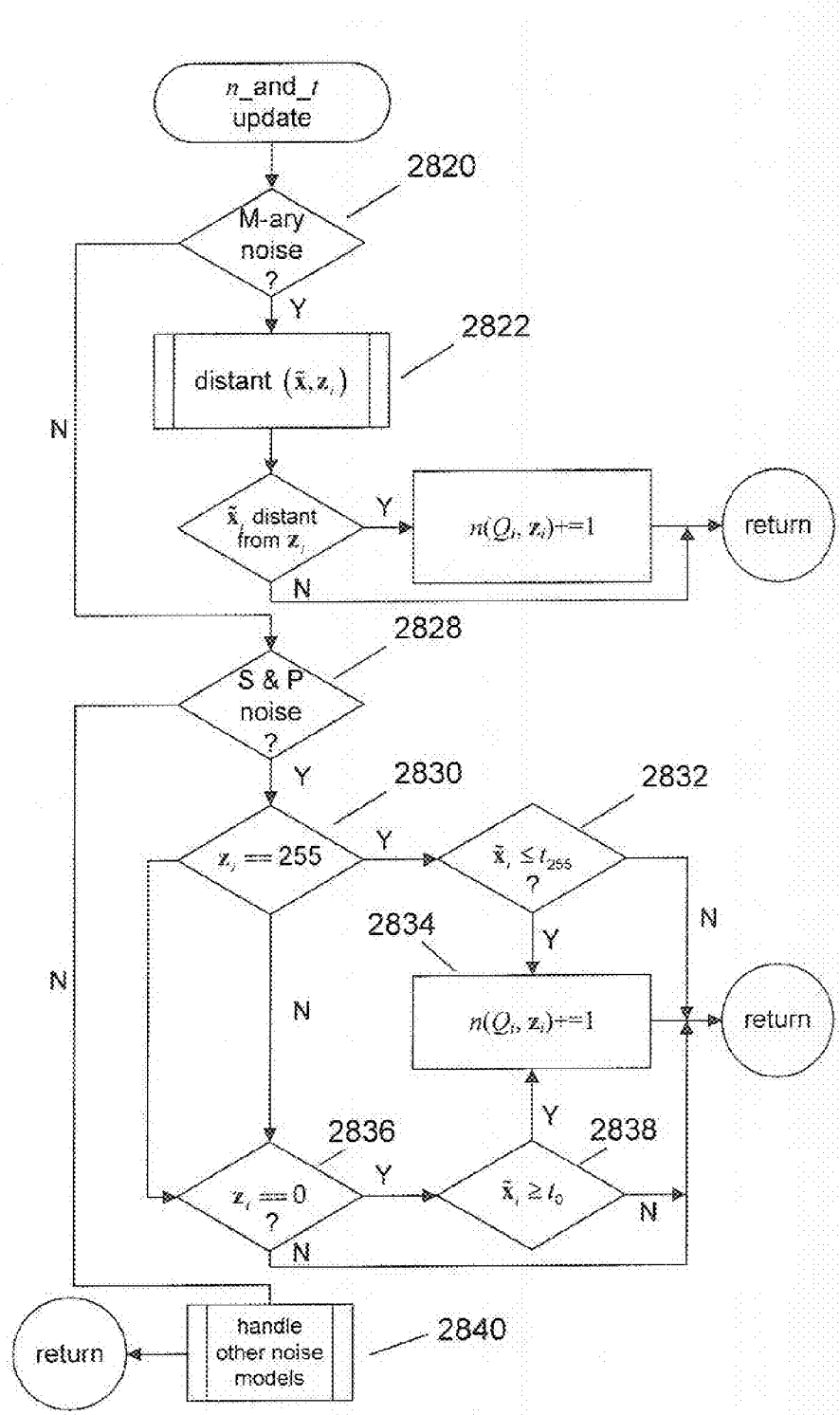

FIG. 28B provides a control-flow diagram for the routine "n_and_t update," called in step 2807 of FIG. 28A. In step 2820, the routine "n_and_t update" determines whether or not the noise model is assumed to be the M-ary symmetric channel noise model. When M-ary symmetric channel noise is assumed, then in step 2822, the routine "distant," described above with reference to FIG. 26, is called to determine whether or not noisy-image symbol $z_i$ is sufficiently distant from predicted symbol $\tilde{x}_i$ to indicate that symbol $z_i$ is noise corrupted. When $z_i$ appears to be noise corrupted, as determined in step 2824, the table entry $n(Q_i, z_i)$ is incremented, in step 2826. Otherwise, when M-ary symmetric channel noise is not assumed, as determined in step 2820, then, in step 2828, the routine "n_and_t update" determines whether salt-and-pepper noise is assumed. When salt-and-pepper noise is not assumed, then the routine "handle other noise models" is called, in step 2840, to update the table entry $n(Q_i, z_i)$ when the predicted symbol $\tilde{x}_i$ is sufficiently distant from the corresponding noisy-image symbol $Z_i$ to indicate that the symbol $z_i$ is noise corrupted, according to another noise model. Otherwise, in step 2830, the routine "n_and_t update" determines whether the symbol $z_i$ has the symbol value $a_{255}$. When the symbol $z_i$ has the symbol value $a_{255}$, then, in step 2832, the routine "n_and_t update" determines whether the predicted symbol $\tilde{x}_i$ is less than or equal to a threshold value $t_{255}$, indicating that $z_i$ is likely a white salt-and-pepper noise value in a dark background. When the predicted symbol $\tilde{x}_i$ is less than or equal to the threshold value $t_{255}$, the table entry $n(Q_i, z_i)$ is incremented, in step 2834. Otherwise, in step 2836, the routine "n_and_t update" determines whether the symbol $z_i$ has the symbol value $a_0$. When the symbol $z_i$ has the symbol value $a_0$, then, in step 2838, the routine "n_and_t update" determines whether the predicted symbol $\tilde{x}_i$ is greater than or equal to a threshold value $t_0$, indicating that $z_i$ is likely a black salt-and-pepper noise value in a light background. When the predicted symbol $\tilde{x}_i$ is greater than or equal to the threshold value $t_0$, the table entry $n(Q_i, z_i)$ is incremented, in step 2834.

Figure 28C:
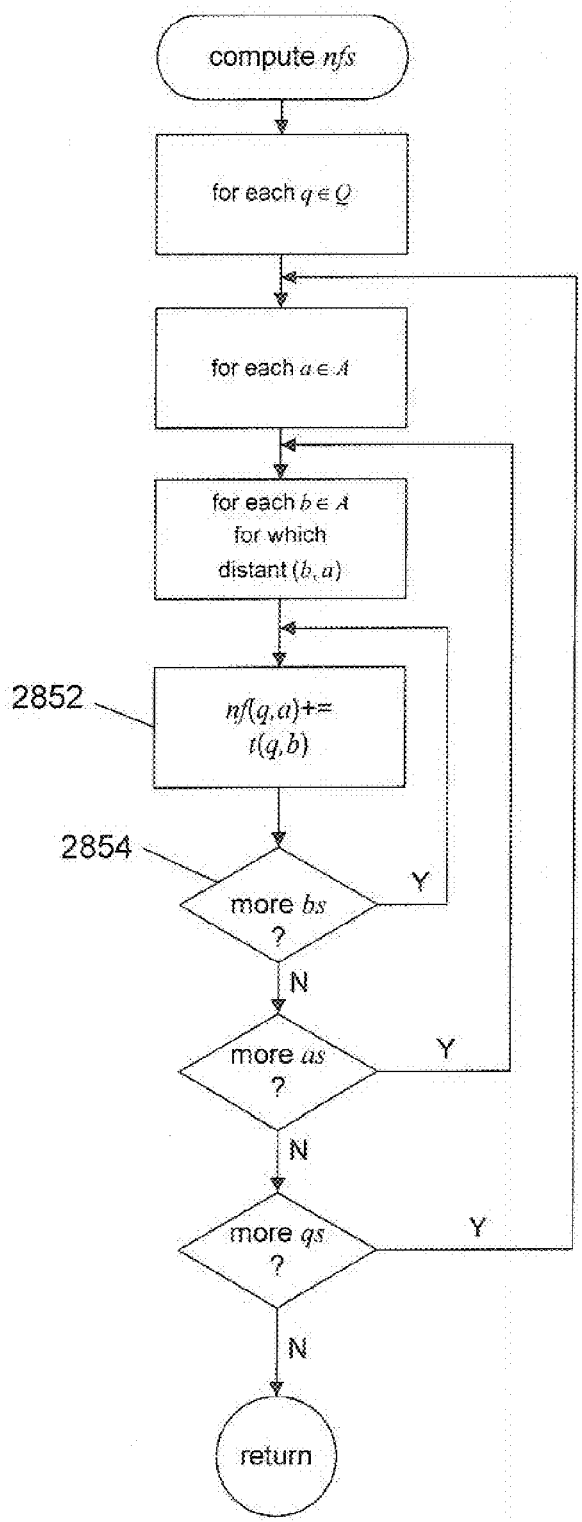

FIG. 28C illustrates computation of the entry values $nf(Q_i, a)$ for the third row of the three-row tables discussed, above, with reference to FIG. 27. The routine is a triply nested loop, in with, for each symbol a of a conditioning class Qi, the number of occurrences of symbols b distant from symbol a in contexts of the conditioning class Qi are summed, in the inner loop comprising steps 2852 and 2854.

Figure 29A:
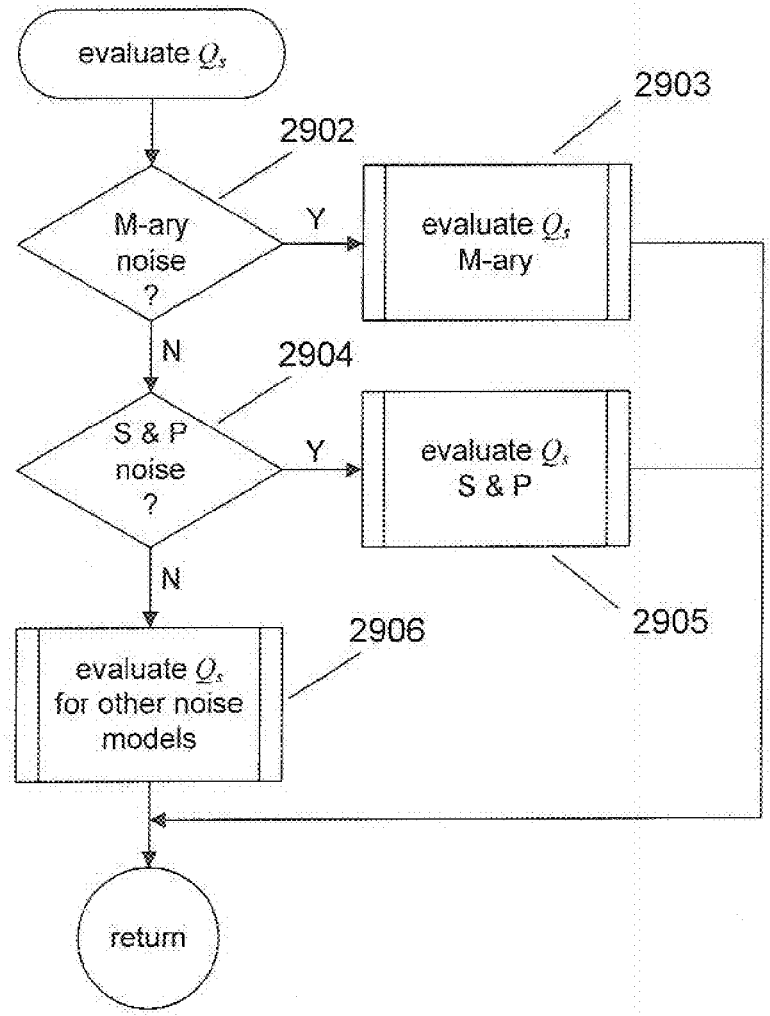

FIG. 29A provides a control-flow diagram for the routine "evaluate $Q_s$," called in step 2812 of FIG. 28. The routine "evaluate $Q_s$" determines, in step 2902, whether or not the noise model is assumed to be the M-ary symmetric channel noise model. When M-ary symmetric channel noise is assumed, then in step 2903, the routine "evaluate Qs M-ary" is called to determine whether or not the each conditioning class $Q_i$ remains statistically valid. Otherwise, when M-ary symmetric channel noise is not assumed, as determined in step 2902, then, in step 2904, the routine "evaluate $Q_s$" determines whether salt-and-pepper noise is assumed. When salt-and-pepper noise is assumed, then, in step 2905, the routine "evaluate $Q_s$" calls the routine "evaluate Qs S&P" to determine whether or not the each conditioning class $Q_i$ remains statistically valid. Otherwise, in step 2906, the routine "evaluate $Q_s$" calls the routine "evaluate Qs for other noise models" to determine whether or not the each conditioning class $Q_i$ remains statistically valid.

Figure 29B:
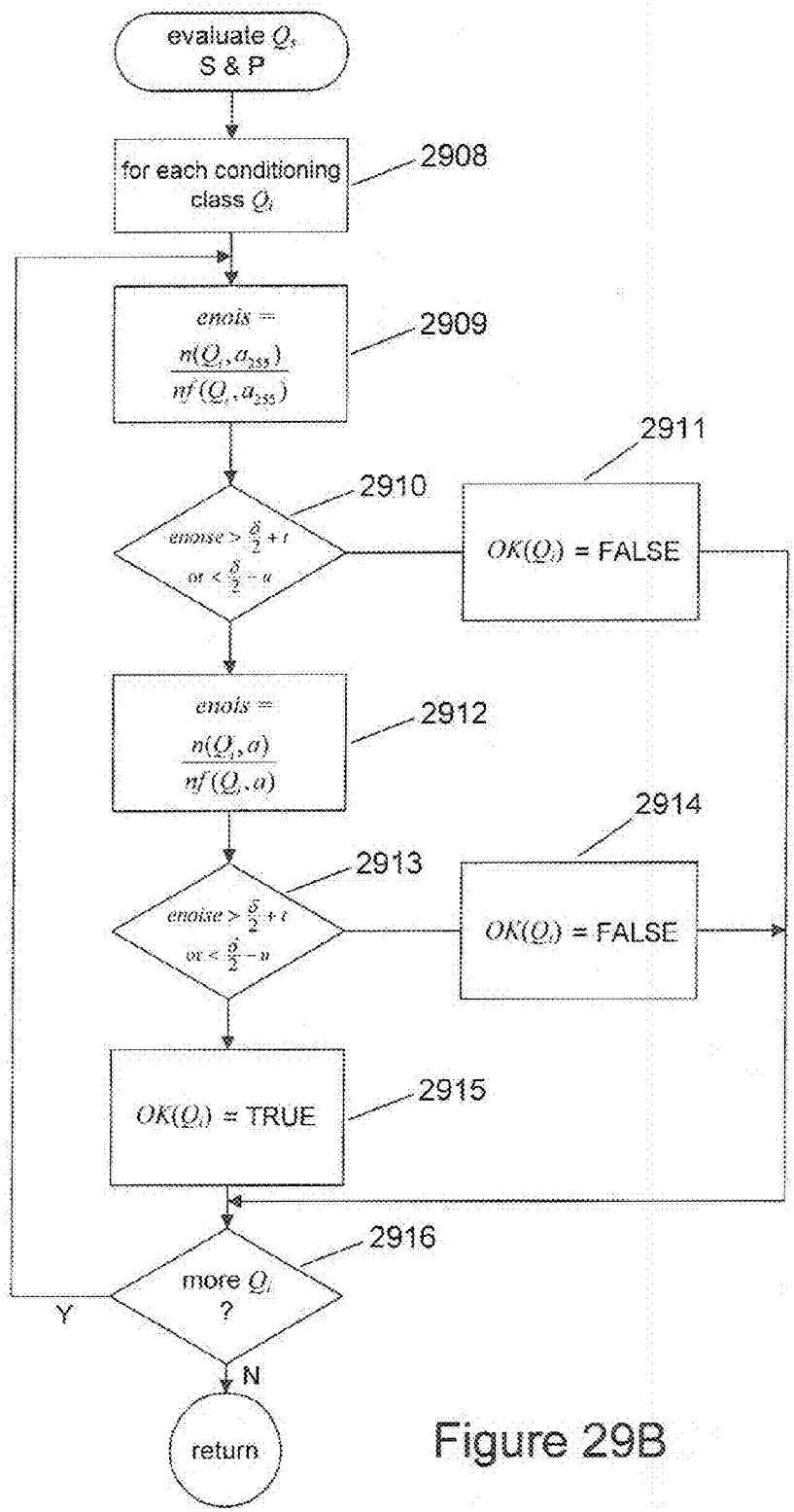

FIG. 29B provides a control-flow diagram for the routine "evaluate Qs S&P," called in step 2905 of FIG. 29A. This function considers each conditioning class $Q_i$, in an outer for-loop of steps 2908-2916, in order to determine whether or not the conditioning class $Q_i$ remains statistically valid, under the discrete-universal-denoiser statistical assumptions. The function $OK(Q_i)$ returns a Boolean value indicating whether or not conditioning class $Q_i$ remains statistically valid. DUDE and related denoising methods build a statistical model of the observed data conditioned on conditioning classes formed from prefiltered data. The noise is memoryless and can therefore be characterized by the M×M matrix Π, discussed above, where M is the number of different symbols in the alphabet and, for symbols a,b, the matrix element Π(a,b) denotes the probability that the noisy symbol is b given that the clean symbol is a. For salt-and-pepper noise, $\Pi(a,0)=1-\delta 2$ when $a=0$ and $\delta/2$ otherwise. Similarly, $\Pi(a, M-1)=1-\delta/2$ when $a=M-1$ and $\delta/2$ otherwise. Additionally, if $a \neq 0, M-1$, $\Pi(a,a)=1-\delta$, whereas if $b \neq 0, M-1, \Pi(a,b)=0$ whenever $b \neq a$, since 0 and M−1 are the only possible error values for salt-and-pepper noise.

In step 2909, the variable enois is set to the value $$\frac{n(Q_i, a_{255})}{nf(Q_i, a_{255})}.$$

This is the ratio of the number of times noisy-image symbol $z_i$ is deemed to be a white salt-and-pepper-noise value in a dark background. When this ratio is greater than the sum of $\delta/2$, the expected probability for white noise values to occur according to the salt-and-pepper noise model, and a threshold-offset value t or when this ratio is less than the difference of $\delta/2$ and a threshold-offset value u, as determined in step 2910, then the function $OK(Q_i)$ is set to return the Boolean value FALSE, in step 2911, since the observed frequency of white noise is deemed to deviate significantly from that indicated by the noise-model probability for the occurrence of white noise. Otherwise, in step 2912, the variable enois is set to the value $$\frac{n(Q_i, a_0)}{nf(Q_i, a_0)}.$$

This is the ratio of the number of times noisy-image symbol $z_i$ has a black salt-and-pepper-noise value in a light background. When this ratio is greater than the sum of $\delta/2$, the expected probability for black noise values to occur according to the salt-and-pepper noise model, and a threshold-offset value t or when this ratio is less than the difference of $\delta/2$ and a threshold-offset value u, as determined in step 2913, then the function $OK(Q_i)$ is set to return the Boolean value FALSE, in step 2914, since the observed frequency of black noise is deemed to deviate significantly from that indicated by the noise-model probability for the occurrence of a black noisy value.

Otherwise, in step 2915, the function $OK(Q_i)$ is set to return the Boolean value TRUE.

Figure 29C:
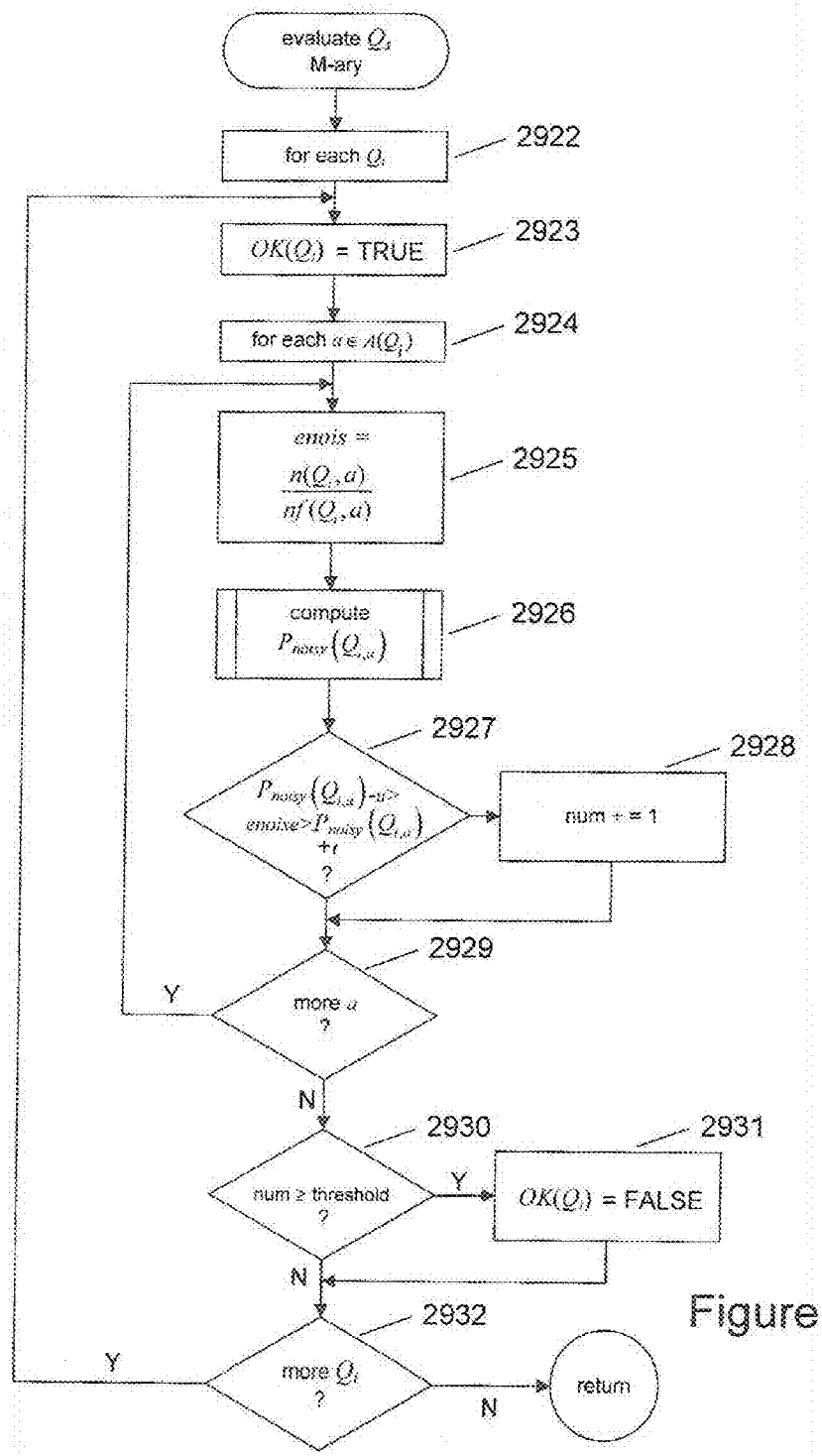

FIG. 29C provides a control-flow diagram for the routine "evaluate Qs M-ary," called in step 2903 of FIG. 29A. This function considers each conditioning class $Q_i$, in an outer for-loop of steps 2922-2932, in order to determine whether or not the conditioning class $Q_i$ remains statistically valid, under the discrete-universal-denoiser statistical assumptions. For each considered conditioning class $Q_i$, the function $OK(Q_i)$ is initialized to return a value TRUE and the local variable num is set to 0, in step 2923. Next, the inner for-loop of steps 2924-2929 considers each symbol a for which $t(Q_i, a)$ is greater than 0. In step 2925, the variable enois is set to the value $$\frac{n(Q_i, a)}{nf(Q_i, a)}.$$

This is the ratio of the number of times predicted symbol $\tilde{x}_i$ is sufficiently distant from the corresponding noisy-image symbol $z_i$, when $z_i$ is equal to symbol a, divided by the number of times that symbols distant from symbol a are observed as a context-embedded symbol in the noisy image for the conditioning class. This ratio is an estimated probability of noise corruption of symbol a.

In step 2926, a routine $P_{noisy}(Q_{i,a})$ is invoked to compute a probability that noisy-image symbol $z_i$ has symbol value a when the predicted symbol $\tilde{x}_i$ is distant from a due to noise introduced by the noisy channel modeled by the matrix $\Pi$. This probability can be computed as the sum of those elements in the column of $\Pi$ corresponding to symbol a for which the symbol corresponding to the row is distant from symbol a, each term weighted by the frequency of occurrence of the symbols corresponding to the rows. In other words, the probability can be computed as the sum of $\Pi$ weighted elements $\Pi_{(x,y)}$ for which y=a and distant (x, a)=TRUE.

In the case of M-ary noise, as for salt-and-pepper noise, for symbols a,b, the matrix element $\Pi(a,b)$ denotes the probability that the noisy symbol is b given that the clean symbol is a. For M-ary noise, $\Pi(a,a)=1-\delta$ and $$\Pi(a, b) = \frac{\delta}{M - 1}$$

for b≠a, with $\delta$ the same for all a. Thus, for M-ary noise, the diagonal elements of $\Pi=1-\delta$ and all $$\text{off-diagonal elements} = \frac{\delta}{M - 1}.$$

In the case of M-ary noise, $P_{noisy}(Q_{i,a})$ is $$\frac{\delta}{M - 1}.$$

When enois is greater than a threshold value, $P_{noisy}(Q_i,a)-u$, or less than a threshold value, $P_{noisy}(Q_i,a)+t$, as determined in step 2927, the variable num is incremented in step 2908. The variable num counts the number of symbols for which the noise-model assumptions are invalid. After evaluating all of the statistics collected for a particular context $Q_i$, when the value of local variable num exceeds a threshold value, as determined in step 2910, the value returned by function $OK(Q_i)$ is set to FALSE to indicate that conditioning class $Q_i$ should not be used for denoising during the current iteration of iterative denoising.

Figure 30:
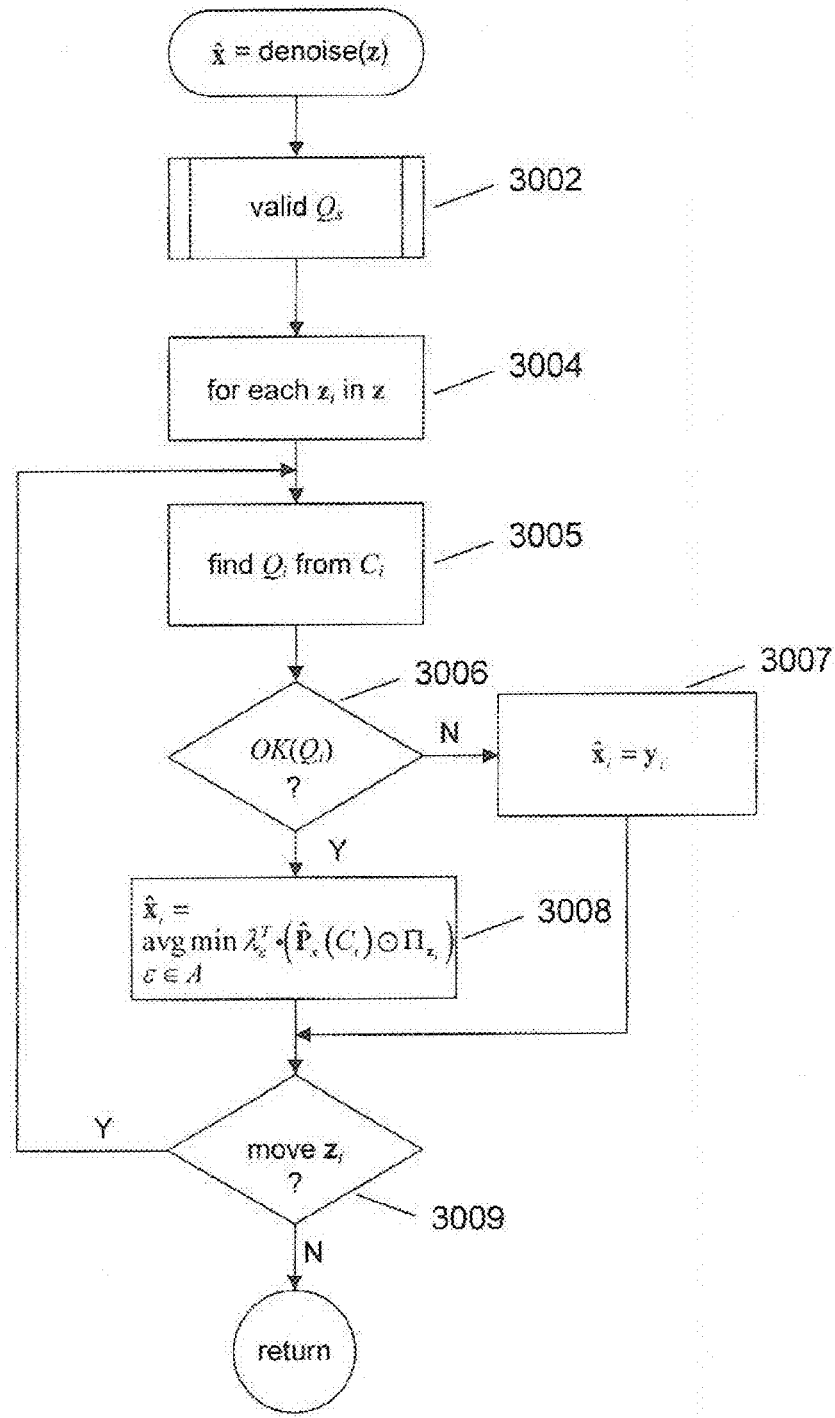
FIG. 30 provides a control-flow diagram for the function "denoise," called in step 2211 of FIG. 22 according to embodiments of the present invention.

FIG. 30 provides a control-flow diagram for the function "denoise," called in step 2211 of FIG. 22 according to embodiments of the present invention. The function "denoise" is illustrated in FIG. 23 for currently implemented iterative denoisers that do not include embodiments of the present invention. Iterative denoisers that do not embody the current invention can be enhanced to embody the methods of the current invention by incorporating the denoise function illustrated in FIG. 30 in place of the denoising function illustrated in FIG. 23. In a first step 3002 of the denoising function that represents one embodiment of the present invention, the function "valid Qs," discussed above with reference to FIGS. 28 and 29, is called in order to determine which of the conditioning classes remain statistically valid. Then, in the for-loop of steps 3004-3009, the noisy image z is denoised, symbol-by-symbol. When the conditioning class corresponding to the currently considered noisy-image symbol $z_i$, $Q_i$, remains statistically valid, as determined in step 3006, then the denoised symbol $\hat{x}_i$ is computed by the distortion-minimization method carried out in step 3008, previously described above with reference to FIG. 23. However, when the conditioning class $Q_i$ is not statistically valid, as determined in step 3006, then the current prefiltered-image symbol value $y_i$ corresponding to $z_i$ is returned as the denoised-image symbol $\hat{x}_i$, in step 3007. In other words, during the iterative denoising procedure illustrated in FIGS. 23A-B, the overall iteration, represented as the do-while loop of steps 2306-2313, proceeds until one or more global convergence criteria are met, as determined in step 2312. However, according to embodiments of the present invention, context-specific denoising based on symbol-prediction-error distributions, as shown in step 3008 of FIG. 30, is carried out only for those conditioning classes that remain statistically valid. Otherwise, the prefiltered image symbol $y_i$ is used as the denoised symbol for $z_i$. In this method, context-based denoising is restricted to those conditioning classes that are considered statistically valid at any point during the iteration. A conditioning class that is currently considered invalid can later become again valid and resume being used for denoising in later iterations. By restricting context-based denoising only to statistically valid contexts, degradation in image quality, expressed as a computed signal-to-noise ratio, for example, over multiple iterations can be ameliorated, largely prevented, or prevented all together. This, in turn, generally leads to convergence, according to global convergence criteria, fewer iterations, and prevents cases in which iteration is terminated at non-optimal points in the iterative process.

Figure 31:
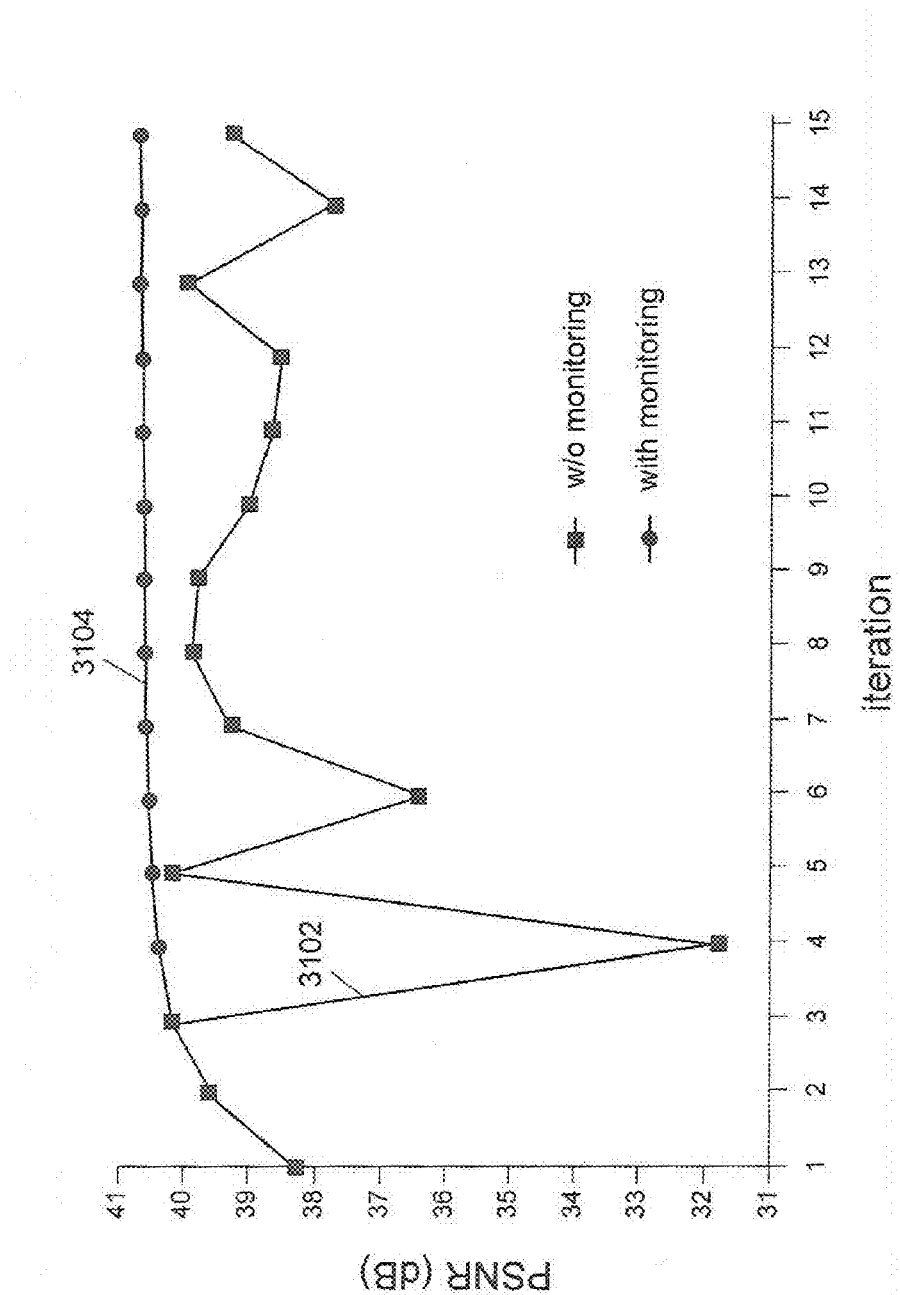
FIG. 31 shows, for illustration purposes, plots of iterative universal denoising processes with and without incorporating method embodiments of the present invention.

FIG. 31 shows, for illustration purposes, plots of iterative universal denoising processes with and without incorporating method embodiments of the present invention. The plots correspond to the application of denoiser embodiments to an actual noisy image. A first curve 3102 shows the signal-to-noise ratio achieved, over successive iterations, when monitoring of the statistical validity of conditioning classes is not carried out according to embodiments of the present invention. Note the precipitous drop in signal-to-noise ratio between iterations 3 and 4. Curve 3104 illustrates the signal-to-noise ratio for successive iterations of an iterative discrete-universal denoising process that incorporates the context-class statistical-validity monitoring according to the present invention. In this case, the signal-to-noise ratio is non-decreasing with respect to the number of iterations, and the stopping point of the procedure becomes non-critical after a few iterations.

Although the present invention has been described in terms of particular embodiments, it is not intended that the invention be limited to these embodiments. Modifications will be apparent to those skilled in the art. For example, method embodiments of the present invention for monitoring the statistical validity of conditioning classes may be implemented in software, firmware, hardware circuitry, or a combination of software, firmware, and hardware circuitry in general purpose computers and various electronic devices that carry out denoising. The discrete-universal-denoising methods and systems that incorporate embodiments of the present invention involve far too many tedious calculations to be carried out by hand in anything close to a reasonable time period and/or with reasonable accuracy for even the smallest images encountered in real-world denoising. Limitations of the present invention may vary with variation in a variety of different implementation parameters, including programming language choice, choice of data structures, control structures, modular organization, and other implementation parameters. A variety of different techniques may be used to estimate $P_{noisy}(Q_i,a)$ for symbol values a and context clusters Qi. In general, estimation is based on the matrix $\Pi$, which describes the noise-introducing channel model. However, other factors and assumptions can be incorporated into the determination of $P_{noisy}(Q_i,a)$. A variety of different thresholds may be used in determination of whether or not a particular conditioning class remains statistically valid. These thresholds may be determined empirically, and may be dynamically altered during denoising of a particular noisy image by an iterative discrete-universal denoiser. The method of the present invention can be applied to denoisers that operate on one-dimensional signals, including audio signals, two-dimensional signals, including images, and higher-dimensional signals.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An iterative denoising method comprising:
    receiving, a noisy dataset z comprising a plurality of noisy-dataset symbols $z_i$; and
    iteratively,
        computing, by a processor, a next prefiltered dataset y comprising a plurality of prefiltered-dataset symbols $y_i$, and
        for each noisy-dataset symbol $z_i$, computing, by the processor, an estimated denoised-dataset symbol $\hat{x}_i$ by:
            when a conditioning class $Q(z_i)$ for the noisy-dataset symbol $z_i$ remains valid for denoising, minimizing a computed distortion determine the estimated denoised-dataset symbol $\hat{x}_i$, and
            when a conditioning class $Q(z_i)$ for the noisy-dataset symbol $z_i$ is not valid for denoising, determining the estimated denoised-dataset symbol $\hat{x}_i$ to be a corresponding prefiltered-dataset symbol $y_i$,
    until a convergence criterion is satisfied.

2. The iterative denoising method of claim 1, further comprising:
    following computing a next prefiltered dataset y,
        collecting, by the processor, prediction-error statistics in a context-by-context analysis of the next prefiltered dataset y and generating prediction-error probability distributions $\hat{P}_E$ for each conditioning class $Q(z_i)$.

3. The iterative denoising method of claim 2, further comprising:
    following generating of the prediction-error probability distributions $\hat{P}_E$ for each conditioning class,
        collecting, by the processor, context-based prediction statistics for each conditioning class; and
        based on the context-based symbol-prediction statistics, determining, by the processor, which conditioning classes remain valid for denoising.

4. The iterative denoising method of claim 3, wherein collecting, by the processor, the context-based symbol-prediction statistics for each conditioning class further comprises:
    for each different conditioning class $Q_k$,
        for each noisy-dataset symbol $z_i$ that occurs in a context $C_i^Y$ of conditioning class $Q_k$,
            incrementing $t(Q_k, z_i)$;
            when $z_i$ is a white-noise symbol $a_w$,
                predicting symbol $\tilde{x}_i$ from context $C_i^y$,
                when $\tilde{x}_i$ is less than a threshold value,
                    incrementing $n(Q_k, z_i)$;
            when $z_i$ is a black-noise symbol $a_b$,
                predicting symbol $\tilde{x}_i$ from context $C_i^y$,
                when $\tilde{x}_i$ is greater than the threshold value,
                    incrementing $n(Q_k, z_1)$; and
    for each different conditioning class $Q_k$,
        for each symbol a in an alphabet A that includes noisy-dataset symbols $z_i$ and estimated denoised-dataset symbols $\tilde{x}_i$,
            for each symbol b in alphabet A distant from a currently considered symbol a,
                adding $t(Q_k, b)$ to $nf(Q_k, a)$.

5. The iterative denoising method of claim 4, wherein determining, by the processor, which conditioning classes remain valid for denoising further comprises:
    for each different conditioning class $Q_k$,
        when $$\frac{n(Q_k, a_w)}{nf(Q_k, a_w)}$$

is greater than a threshold value t+a frequency of symbol $a_w$ occurring as a result of noise in noisy dataset z or when $$\frac{n(Q_k, a_w)}{nf(Q_k, a_w)}$$

is less than the expected frequency of symbol $a_w$– a threshold value u occurring as a result of noise in noisy dataset z; determining that conditioning class $Q_k$ is no longer valid; and
when $$\frac{n(Q_k, a_b)}{nf(Q_k, a_b)}$$

is greater than a threshold value t+ an expected frequency of symbol $a_b$ occurring as a result of noise in noisy dataset z or when $$\frac{n(Q_k, a_b)}{nf(Q_k, a_b)}$$

is less than the expected frequency of symbol $a_b$ – the threshold value u occurring as a result of noise in noisy dataset z; determining that conditioning class $Q_k$ is no longer valid.

6. The iterative denoising method of claim 3, wherein collecting, by the processor, context-based symbol-prediction statistics for each conditioning class further comprises:
for each different conditioning class $Q_k$,
for all symbols $a_0$-$a_{M-1}$ of alphabet A, setting $n(Q_k, a)$ equal to 0, setting $t(Q_k, a)$ equal to 0, and setting nf $(Q_k, a)$ equal to 0;
for each noisy-dataset symbol $z_i$ that occurs in a context $C_i^y$ of conditioning class $Q_k$,
incrementing $t(Q_k, z_i)$;
predicting symbol $\tilde{x}_i$ from context $C_i^y$;
computing a distance d from $z_i$ to $\tilde{x}_i$ within alphabet A; and
when d is greater than a threshold distance, incrementing $n(Q_k, z_i)$.

7. The iterative denoising method of claim 6, wherein determining, by the processor, which conditioning classes remain valid for denoising further comprises:
for each different conditioning class $Q_k$,
setting num equal to 0;
for all symbols $a_0$-$a_{M-1}$ of alphabet A for which $n(Q_k, a)>0$,
when $$\frac{n(Q_k, a)}{nf(Q_k, a)}$$

is greater than a threshold value T times an expected frequency of symbol a occurring as a result of noise in noisy dataset z or when $$\frac{n(Q_k, a)}{nf(Q_k, a)}$$

is less than a threshold value U times an expected frequency of symbol a occurring as a result of noise in noisy dataset z, incrementing num;
when num is greater than a threshold value, determining that conditioning class $Q_k$ is no longer valid, and
when num is less than or equal to the threshold value, determining that conditioning class $Q_k$ remains valid.

8. The iterative denoising method of claim 1, wherein computing, by the processor, a next prefiltered dataset y further comprises,
in a first iteration, filtering the noisy dataset z by a context-based filtering method; and
in all remaining iterations, setting the prefiltered dataset y to a denoised dataset $\hat{x}$ generated in a preceding iteration.

9. A non-transitory computer readable medium on which is stored machine readable instructions that when executed by a processor implement an iterative denoising method, said machine readable instructions comprising code to:
receive a noisy dataset z comprising a plurality of noisy-dataset symbols $z_i$;
iteratively
generates generate a next prefiltered dataset y comprising a plurality of prefiltered-dataset symbols $y_i$, and
for each noisy-dataset pixel $z_i$, determine an estimated denoised-dataset symbol by $\hat{x}_i$ by
when a conditioning class $Q(z_i)$ for the noisy-dataset symbol $z_i$ remains valid for denoising, minimize a computed distortion over all possible symbols $a_0$-$a_{M-1}$ of alphabet A to determine the estimated denoised-dataset symbol $\hat{x}_i$, and
when the conditioning class $Q(z_i)$ for $z_i$ is not valid for denoising, determine the estimated denoised-dataset symbol $\hat{x}_i$ to be a corresponding prefiltered-dataset symbol $y_i$,
until a convergence criterion is satisfied; and
store a predicted denoised dataset $\hat{x}$ comprising the estimated denoised-dataset symbols $\hat{x}_i$.

10. The non-transitory computer readable medium according to claim 9, said machine readable instructions further comprising code to:
following generation of a next prefiltered dataset y,
collect prediction-error statistics in a context-by-context analysis of the next prefiltered dataset y and generate prediction-error probability distributions $\hat{P}_E$ for each conditioning class $Q(z_i)$;
collect context-based prediction statistics for each conditioning class; and
based on the context-based symbol-prediction statistics, determine which conditioning classes remain valid for denoising.

11. The non-transitory computer readable medium according to claim 10, wherein the code to collect of the context-based symbol-prediction statistics for each conditioning class further comprises code to:
for each different conditioning class $Q_k$,
for each noisy-dataset symbol $z_i$ that occurs in a context $C_i^y$ of conditioning class $Q_k$,
increment $t(Q_k, z_1)$;
when $z_i$ is a white-noise symbol $a_w$,
predict symbol $\hat{x}_i$ from context $C_i^y$,
when $\hat{x}_i$ is less than a threshold value,
increment $n(Q_k, z_i)$;
when $z_i$ is a black-noise symbol $a_b$,
predict symbol $\hat{x}_i$ from context $C_i^y$,
when $\tilde{x}_i$ is greater than the threshold value,
increment $n(Q_k, z_1)$; and
for each different conditioning class $Q_k$,
for each symbol a in an alphabet A that includes noisy-dataset symbols $z_i$ and estimated denoised-dataset symbols $\hat{x}_i$,
for each symbol b in alphabet A distant from a currently considered symbol a,
add $t(Q_k, b)$ to $nf(Q_k, a)$.

12. An electronic device comprising:
hardware circuitry to receive a nosiy dataset z comprising a plurality of noisy-dataset symbols $z_i$;
wherein the hardware circuitry is to iteratively
generate a next prefiltered dataset y comprising a plurality of prefiltered-dataset symbols $y_i$, and
for each noisy-dataset pixel $z_i$ determine an estimated denoised-dataset symbol $\hat{x}_i$ by
when a conditioning class $Q(z_i)$ for the noisy-dataset symbol $z_i$ remains valid for denoising, minimize a computed distortion over all possible symbols $a_0$-$a_{M-1}$ of alphabet A to determine the estimated denoised-dataset symbol $\hat{x}_i$, and when the conditioning class $Q(z_i)$ for $z_i$ is not valid for denoising, determine the estimated denoised-dataset symbol $\hat{x}_i$ to be a corresponding prefiltered-dataset symbol $y_i$, until a convergence criterion is satisfied; and store a predicted denoised dataset $\hat{x}$ comprising the estimated denoised-dataset symbols $\hat{x}_i$.

13. The electronic device according to claim 12, wherein the hardware circuitry is further to:

following generation of a next prefiltered dataset y, collect prediction-error statistics in a context-by-context analysis of the next prefiltered dataset y and generate prediction-error probability distributions $\hat{P}_E$ for each conditioning class $Q(z_i)$;

collect context-based prediction statistics for each conditioning class; and based on the context-based symbol-prediction statistics, determine which conditioning classes remain valid for denoising.

14. The electronic device according to claim 13, wherein the hardware circuitry is to collect the context-based symbol-prediction statistics for each conditioning class by:

for each different conditioning class $Q_k$, for each noisy-dataset symbol $z_i$ that occurs in a context $C_i^y$ of conditioning class $Q_k$, increment $t(Q_k, z_i)$;

when $z_i$ is a white-noise symbol $a_w$, predict symbol $\tilde{x}_i$ from context $C_i^y$, when $\hat{x}_i$ is less than a threshold value, increment $n(Q_k, z_i)$;

when $z_i$ is a black-noise symbol $a_b$, predict symbol $\hat{x}_i$ from context $C_i^y$, when $\hat{x}_i$ is greater than the threshold value, increment $n(Q_k, z_i)$; and for each different conditioning class $Q_k$, for each symbol a in an alphabet A that includes noisy-dataset symbols $z_i$ and estimated denoised-dataset symbols $\hat{x}_i$, for each symbol b in alphabet A distant from a currently considered symbol a, add $t(Q_k, b)$ to $nf(Q_k, a)$.

15. The electronic device according to claim 14, wherein the hardware circuitry is to collect the context-based symbol-prediction statistics for each conditioning class by:

for each different conditioning class $Q_k$, for all symbols $a_0$-$a_{M-1}$ of alphabet A, setting $n(Q_k, a)$ equal to 0, setting $t(Q_k, a)$ equal to 0, and setting $nf(Q_k, a)$ equal to 0;

for each noisy-dataset symbol $z_i$ that occurs in a context $C_i^y$ of conditioning class $Q_k$, incrementing $t(Q_k, z_i)$;

predicting symbol $\tilde{x}_i$ from context $C_i^y$;

computing a distance d from $z_i$ to $\tilde{x}_i$ within alphabet A; and when d is greater than a threshold distance, incrementing $n(Q_k, z_i)$.

* * * * *

UNITED STATES PATENT AND TRADEMARK OFFICE
CERTIFICATE OF CORRECTION

PATENT NO. : 8,385,676 B2  Page 1 of 2
APPLICATION NO. : 12/512548
DATED : February 26, 2013
INVENTOR(S) : Marcelo Weinberger et al.

It is certified that error appears in the above-identified patent and that said Letters Patent is hereby corrected as shown below:

In the Claims:

In column 24, line 30, in Claim 4, delete "$n(Q_k, z_1);$" and insert -- $n(Q_k, z_i);$ --, therefor.

In column 24, line 34, in Claim 4, delete "$\tilde{X}_i,$" and insert -- $\hat{X}_i,$ --, therefor.

In column 26, line 6, in Claim 9, delete "generates generate" and insert -- generate --, therefor.

In column 26, line 42, in Claim 11, delete "$t(Q_k, z_1);$" and insert -- $t(Q_k, z_i);$ --, therefor.

In column 26, line 44, in Claim 11, delete "$\hat{X}_i$" and insert -- $\tilde{X}_i$ --, therefor.

In column 26, line 45, in Claim 11, delete "$\hat{X}_i$" and insert -- $\tilde{X}_i$ --, therefor.

In column 26, line 48, in Claim 11, delete "$\hat{X}_i$" and insert -- $\tilde{X}_i$ --, therefor.

In column 26, line 50, in Claim 11, delete "$n(Q_k, z_1);$" and insert -- $n(Q_k, z_i);$ --, therefor.

In column 26, line 59, in Claim 12, delete "nosiy'" and insert -- noisy --, therefor.

In column 26, line 64, in Claim 12, delete "$z_i$" and insert -- $z_i$, --, therefor.

In column 27, line 4, in Claim 12, delete "$z_i$is" and insert -- $z_i$ is --, therefor.

In column 27, line 27, in Claim 14, delete "$z_i$that" and insert -- $z_i$ that --, therefor.

Signed and Sealed this
Thirteenth Day of August, 2013

Teresa Stanek Rea
*Acting Director of the United States Patent and Trademark Office*

CERTIFICATE OF CORRECTION (continued)
U.S. Pat. No. 8,385,676 B2

In column 28, line 2, in Claim 14, delete "$\hat{x}_i$" and insert -- $\tilde{x}_i$ --, therefor.

In column 28, line 5, in Claim 14, delete "$\hat{x}_i$" and insert -- $\tilde{x}_i$ --, therefor.

In column 28, line 6, in Claim 14, delete "$\hat{x}_i$" and insert -- $\tilde{x}_i$ --, therefor.